(12) United States Patent
Tritschler et al.

(10) Patent No.: US 11,349,344 B2
(45) Date of Patent: May 31, 2022

(54) SAFE OPERATION IN WIRELESS POWER TRANSMISSION SYSTEMS

(71) Applicant: Wiferion GmbH, Freiburg im Breisgau (DE)

(72) Inventors: Johannes Tritschler, Freiburg (DE); Benriah Goeldi, Freiburg (DE)

(73) Assignee: Wiferion GmbH, Freiburg im Breisgau (DE)

( * ) Notice: Subject to any disclaimer, the term of this patent is extended or adjusted under 35 U.S.C. 154(b) by 0 days.

(21) Appl. No.: 17/262,675

(22) PCT Filed: Jul. 23, 2019

(86) PCT No.: PCT/EP2019/069776
§ 371 (c)(1),
(2) Date: Jan. 22, 2021

(87) PCT Pub. No.: WO2020/020875
PCT Pub. Date: Jan. 30, 2020

(65) Prior Publication Data
US 2021/0305845 A1    Sep. 30, 2021

(30) Foreign Application Priority Data
Jul. 25, 2018 (EP) ...................... 8185532

(51) Int. Cl.
*H02J 50/12* (2016.01)
*H02J 50/80* (2016.01)
*H02M 1/32* (2007.01)
*H02M 7/06* (2006.01)

(52) U.S. Cl.
CPC .............. *H02J 50/12* (2016.02); *H02J 50/80* (2016.02); *H02M 1/32* (2013.01); *H02M 7/06* (2013.01)

(58) Field of Classification Search
CPC ............ H02J 50/12; H02J 50/80; H02M 1/32; H02M 7/06
See application file for complete search history.

(56) References Cited

U.S. PATENT DOCUMENTS

| 2011/0254379 A1 | 10/2011 | Madawala |
| 2015/0001956 A1 | 1/2015 | Saen et al. |
| 2015/0274023 A1 | 10/2015 | Houivet et al. |

OTHER PUBLICATIONS

International Search Report and Written Opinion for International Application No. PCT/EP2019/069776, dated Sep. 23, 2019.

*Primary Examiner* — Robert L Deberadinis
(74) *Attorney, Agent, or Firm* — Wolf, Greenfield & Sacks, P.C.

(57) ABSTRACT

A mobile side circuit of a wireless power transmission system comprises a mobile side resonant circuit inductively coupled to a stationary side resonant circuit of the wireless power transmission system. A mobile side control circuit is adapted to change the operative mode of a mobile side rectifier upon occurrence of a failure state in the mobile side circuit. The present invention ensures a safe operation of the wireless power transmission system while effectively avoiding damage to the mobile side circuitry upon occurrence of a failure state at the mobile side.

15 Claims, 16 Drawing Sheets

SAFE OPERATION IN WIRELESS POWER TRANSMISSION SYSTEMS

CROSS-REFERENCE TO RELATED APPLICATIONS

This Application is a national stage filing under 35 U.S.C. § 371 of International Patent Application Serial No. PCT/EP2019/069776, filed Jul. 23, 2019, which claims priority to European Application Serial No. 18185532.1, filed Jul. 25, 2018. The entire contents of these applications are incorporated herein by reference in their entireties.

FIELD OF INVENTION

The present invention relates to the safe operation of wireless power transmission systems, and in particular to a mobile side circuit of a wireless power transmission system wherein the circuit topology in a mobile side rectifier is dynamically configurable upon occurrence of a failure state in the mobile side circuit, further to a wireless power transmission system using the mobile side circuit, and to related methods of operation for the mobile side circuit and the wireless power transmission system.

TECHNICAL BACKGROUND

Wireless power transmission systems, also referred to as inductive power transmission systems have huge advantages over cable connected systems. Due to technological advancements, wireless power transmission systems used for, e.g., charging of mobile batteries gain more and more attention.

In general, wireless power transmission systems consist of a stationary side circuit and a mobile side circuit. The stationary side circuit has a switched mode electronic circuit acting as a stationary excitation unit for stationary side resonant circuit consisting of at least one capacitor and a transmission coil. At the mobile side circuit, a voltage and current are induced in a mobile side resonant circuit. A passive or active rectifier feeds directly a battery or a mobile energy system which consists of several loads, e.g., DC/DC-converter and energy storage devices like batteries, Supercaps, and/or Ultracaps.

FIG. 1 shows a schematic diagram of a wireless power transmission system using series-series compensation as known in the art.

As shown in FIG. 1, a series-series compensation technique may be used in a wireless power transmission system. For the stationary side circuit there is provided a stationary excitation unit 1 which feeds the stationary side resonant circuit 2. In the mobile side circuit a bridge rectifier 4 converts the received AC-Signals output by the mobile side resonant circuit 3 into DC output voltages and currents. The output of the rectifier 4 is connected in parallel to a smoothing capacitor and a load 6 which may be a battery or any other consumer or storage device. In general there is provided a switching element 5 to protect the load 6 upon occurrence of a failure state in the mobile side circuit.

However, an opening of the switching element 5 or any other event which leads to an open circuit on the mobile side circuit can lead to over-voltages at the output of the mobile side resonant circuit as the stationary power supply still continues to feed the mobile side resonant circuit with energy. This can lead to damaging the mobile side electronics. To avoid damage to the mobile side electronics the mobile side circuit needs to be protected without time delay upon occurrence of a mobile side failure state.

To solve this problem, in U.S. Pat. No. 6,037,745 it is proposed to short-circuit the mobile side resonant circuit without shorting the mobile side battery or energy storage device. For series-series compensation topologies this can be seen as state of the art. However, shorting the mobile side resonant circuit interrupts the power supply to the battery but does not interrupt the current in the mobile side resonant circuit. In view of this in EP 2 903 852 B1 it is suggested to short circuit the mobile side resonant circuit and to detect the short circuit on the stationary side for interruption of power supply from the stationary side resonant circuit.

FIG. 2 shows voltage and current waveforms after establishing a short circuit of the mobile side resonant circuit of the mobile side circuit for a series-series-compensated inductive power transmission system.

As shown in FIG. 2, shorting the mobile side resonant circuit as described above leads to a sudden very hard step response of the mobile side resonant circuit and thus to very high currents and extremely high voltage peaks in the power transmission coils as well as in the resonant capacitors. This can lead to isolation failures in these parts or to a damage or a degrading of the short-circuit switches due to the high currents.

As also shown in FIG. 2, the sudden voltage step generates extremely high currents which reach nearly four times the initial steady state current. This leads to very high voltages in the transmission coils as well as in the resonant capacitors. On the other side the shorting MOSFET circuits are confronted with very high current stresses.

SUMMARY OF INVENTION

In view of the above the object of the invention is to ensure a safe operation of the wireless power transmission system while effectively avoiding damage to the mobile side circuitry upon occurrence of a failure state at the mobile side.

According to a first aspect of the present invention this object is achieved by a mobile side circuit of a wireless power transmission system. The mobile side circuit comprises a mobile side resonant circuit inductively coupled to a stationary side resonant circuit of the wireless power transmission system, a mobile side rectifier adapted to operate in a first operative mode being a half-bridge rectification mode or a full bridge rectification mode during failure-free operation of the mobile side circuit, and an energy storage circuit connected in parallel to output terminals of the mobile side rectifier and adapted to smooth the output of the mobile side rectifier. Further, a mobile side control circuit is adapted to control at least one switching element connected in parallel to at least one rectifying element of the mobile side rectifier to change the first operative mode of the mobile side rectifier to a second operative mode upon occurrence of a failure in the mobile side circuit. According to the present invention the second operative mode is different from the first operative mode and is selected from a group comprising a half-bridge mode, a full-bridge mode, a DC mode where the voltage across the energy storage circuit is switched through to the input of mobile side rectifier with or without polarity reversion, and an antiphase mode where the input voltage and the input current of the mobile side rectifier are phase-shifted with respect to each other according to a predetermined phase-shift.

According to a second aspect of the present invention this object is achieved by a wireless power transmission system comprising a mobile side circuit according to the first aspect. The wireless power transmission system further comprises a stationary side excitation unit adapted to excite a stationary side resonant circuit for wireless power transmission to the mobile side circuit and a stationary side controller. The stationary side controller is adapted to control operation of the stationary excitation unit, monitor power transfer to the mobile side circuit, and to interrupt wireless power transmission when a change in an amount of power transmitted to the mobile side circuit exceeds a predetermined threshold.

According to a third aspect of the present invention this object is achieved by a method of operating a mobile side circuit according to the first aspect of the present invention comprising the steps of operating the mobile side rectifier in an operative mode being a half-bridge rectification mode or a full bridge rectification mode during failure-free operation of the mobile side circuit and controlling at least one switching element connected in parallel to at least one rectifying element of the mobile side rectifier to change the first operative mode of the mobile side rectifier to a second operative mode upon occurrence of a failure state in the mobile side circuit. Here, the second operative mode is different from the first operative mode and is selected from a group comprising a half-bridge mode, a full-bridge mode, a DC mode where the voltage across the energy storage circuit is switched through to the input of mobile side rectifier with or without polarity reversion, and an antiphase mode where the input voltage and the input current of the mobile side rectifier are shifted with respect to each other according to a predetermined range.

According to a fourth aspect of the present invention this object is achieved by a method of operating a wireless power transmission system according to the second aspect of the present invention comprising the step of monitoring power transfer to the mobile side circuit and the step of interrupting wireless power transmission when a change in an amount of power transmitted to the mobile side circuit exceeds a predetermined threshold.

BRIEF DESCRIPTION OF DRAWING

In the following embodiments of the present invention will be described with reference to the drawing in which.

DETAILED DESCRIPTION

Figure 1:
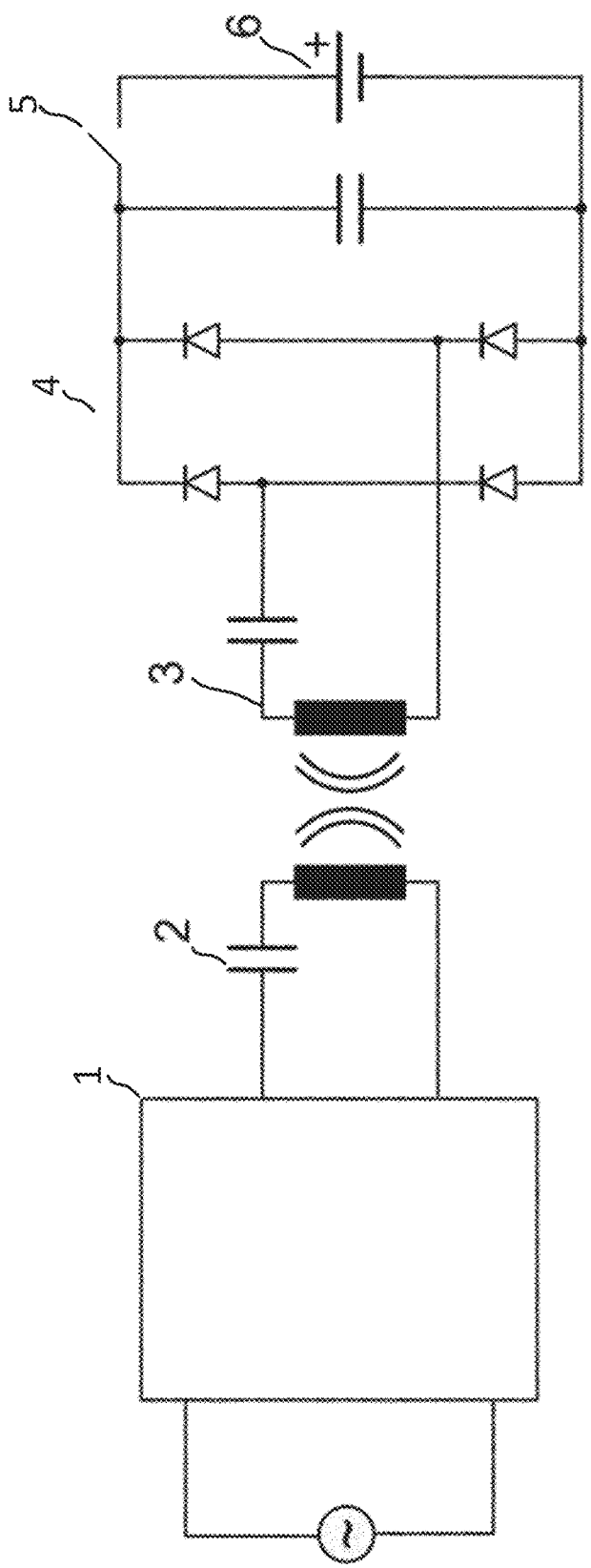
FIG. 1 shows a schematic diagram of a wireless power transmission system using series-series compensation as known in the art.

In the following the present invention will be explained in detail with reference to the drawing. Here, it should be understood that such explanation is related to examples of the present invention only and not binding to the scope of the present invention as defined by the claims. As far as reference is made to specific circuit components this is to be considered as example for the underlying functionality such the circuit components are clearly exchangeable as long as the same functionality is achieved.

Figure 3:
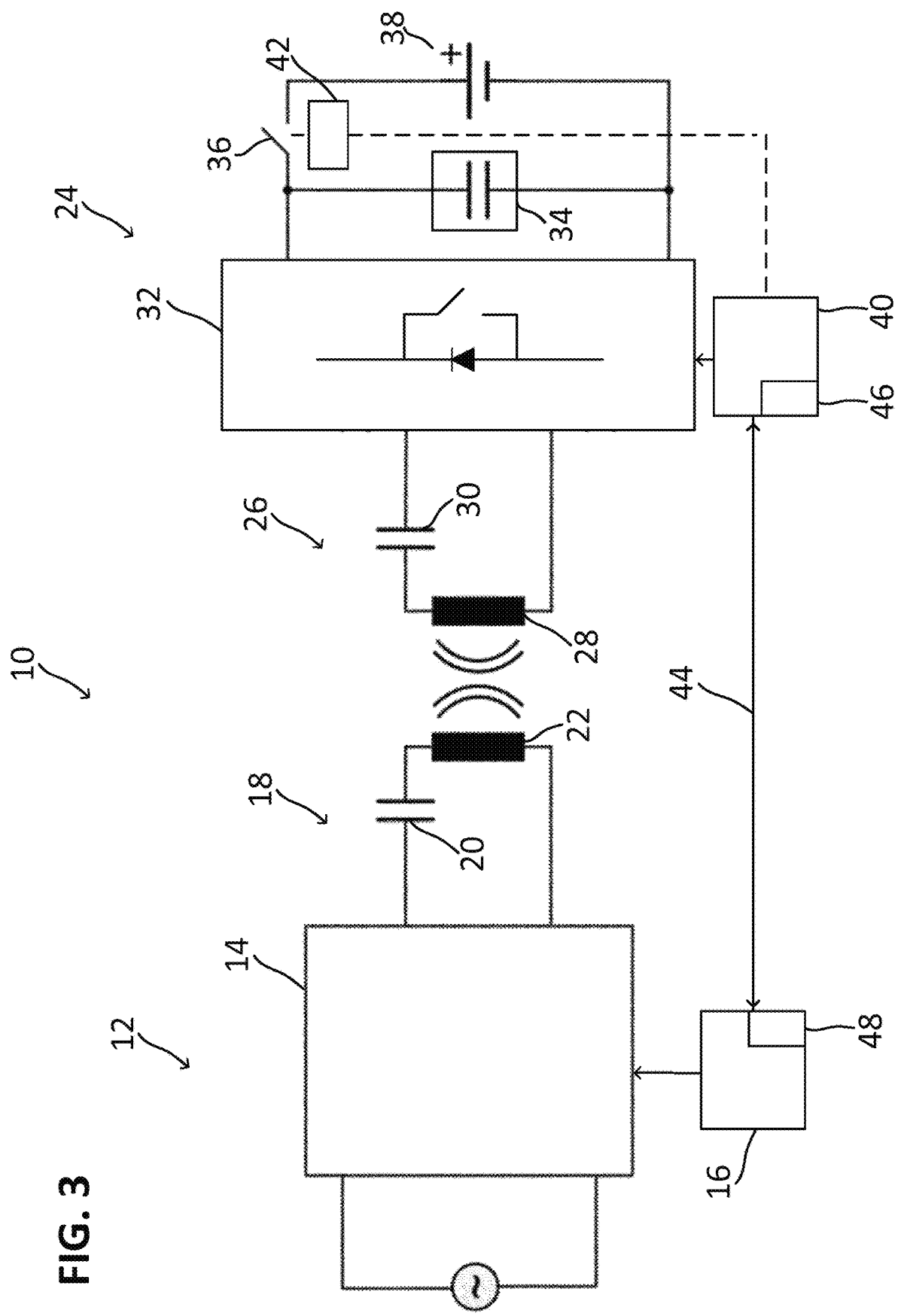
FIG. 3 shows a schematic diagram of a wireless power transmission system using series-series compensation according to the present invention.

FIG. 3 shows a schematic diagram of a wireless power transmission system 10 using series-series compensation according to the present invention.

As shown in FIG. 3, the inductive power transfer system 10 has a stationary side circuit 12 comprising a stationary side DC/AC converter 14, a stationary side controller 16, and a stationary side resonant circuit 18 set up from with at least one stationary side capacitor 20 and at least one stationary side transmitter coil 22.

Operatively, the stationary side DC/AC converter 14 is adapted to excite the stationary side resonant circuit 18 for generation of an oscillating magnetic field during wireless power transmission. Further, operatively the stationary side controller 16 is adapted to measure the stationary side high frequency current and optionally the stationary side high frequency voltage for control of the primary side DC/AC converter 14. Still further, operatively the stationary side controller 16 optionally is adapted to measure the amount of power transmitted wirelessly from the stationary side circuit 12 to a mobile side circuit 24 of the wireless power transmission system 10.

As shown in FIG. 3, the wireless power transfer system 10 also has at least one mobile side circuit 24 separated from the stationary side circuit 12.

As shown in FIG. 3, the mobile side circuit 24 comprises a mobile side resonant circuit 26 set up from at least one a receiver coil 28 connected in series to at least one mobile side capacitor 30. The mobile side circuit 24 further comprises a mobile side rectifier 32. At the input the mobile side rectifier 32 is connected to the mobile side resonant circuit 26 and at the output the mobile side rectifier 32 is connected to an energy storage circuit 34. The energy storage circuit 34, e.g., a capacitor, is connected via a switch 36 to a load 38. The mobile side circuit 24 comprises a mobile side controller 40 adapted to control the mobile side rectifier 32.

As shown in FIG. 3, the mobile side circuit may also comprise a mobile side failure detector 42 adapted to detect occurrence of a failure state at the mobile side circuit 24 and coupled to the mobile side controller 40. Optionally, the mobile side controller 40 may comprise a mobile side communication interface 46 adapted to indicate the occurrence of a failure state to the stationary side controller 16.

Operatively, the receiver coil 28, when placed in the magnetic field produced by the transmitter coil 22, receives energy transmitted by the transmitter coil 22 through inductive coupling. The inductive coupling leads to generation of a mobile side high frequency voltage and a mobile side high frequency current in the mobile side resonant circuit 26.

Operatively, the mobile side rectifier 32 is adapted to convert the mobile side high frequency voltage and the mobile side high frequency current into a mobile side rectified voltage under control of the mobile side controller 40 for subsequent smoothing by the energy storage circuit 34. Also, operatively the mobile side rectifier 32 outputs a mobile side direct current for supply to the load 38 across the switch 36.

Operatively, the mobile side controller 40 may be adapted to measure the mobile side high frequency current and to measure the mobile side high frequency voltage as input to the mobile side rectifier 32, as an option. Further, the mobile side controller 40 is adapted to measure the mobile side direct current and/or the mobile side DC voltage and to process generated measurement results for control of the mobile side rectifier 32.

As shown in FIG. 3, according to the present invention the provision of a wireless communication link 44 between the stationary side circuit 12 and the mobile side circuit 24 is an option. In this case, the stationary side controller 16 comprises a first communication interface 48 and the mobile side controller 40 comprises a second communication interface 46. It should be noted that according to the present invention there no restriction regarding the type of wireless communication implemented for the wireless communication link 44 which may rely, e.g., on the IrDa standard, or alternatively on Bluetooth WiFi, WLAN, etc.

Generally, very often rectifiers on the mobile side of a wireless power transmission system use full- or half-bridge rectifiers set up from at least two rectifying element, e.g., diodes or active switching elements controlled by the mobile side controller 40 to implement the rectifying functionality.

In the most general sense according to the present invention it is suggest to provide the option to bypass or short circuit at least rectifying element in the mobile side rectifier 32 upon occurrence of a failure. As will be explained in more detail in the following this allows to change the operative mode of the mobile side rectifier 32 to one operative mode selected from a group comprising:

a half-bridge mode;
a full-bridge mode;
a DC mode without polarity reversion where the voltage across the energy storage circuit 34 is switched through to the input side of the mobile side rectifier 32 without reversion of polarity of the voltage across the energy storage circuit 34;
a DC mode with polarity reversion where the voltage across the energy storage circuit 34 is switched through to the input side of the mobile side rectifier 32 with reversion of polarity of the voltage across the energy storage circuit 34;
an antiphase mode where the input voltage and the input current of the mobile side rectifier 32 are phase-shifted with respect to each other according to a predetermined range of phase-shift, e.g., by mapping the voltage across the energy storage circuit 34 to the input side of the mobile side rectifier while maintain voltage polarity when the current flowing through the mobile side resonant circuit 26 has negative polarity and by mapping the voltage across the energy storage circuit 34 to the input side of the mobile side rectifier while reversing voltage polarity when the current flowing through the mobile side resonant circuit 26 has positive polarity.

In the most general sense the change of operation mode in the mobile side rectifier 32 changes the output power of the mobile side rectifier 32 to reduce the stress and avoid damage to the mobile side circuit. E.g., a transition from full-bridge mode to half-bridge mode suddenly reduces the output power by half. According to the present invention, this event can be detected on the stationary side to interrupt wireless power transmission from the stationary side circuit to the mobile side circuit.

An important advantage of the present invention is that the provision of a communication channel between the stationary side circuit and the mobile side circuit to communicate occurrence of a failure with time delays is not mandatory. To the contrary, the present invention enables immediate action by the mobile side circuit to handle an occurrence of a failure without time delay.

Further, while a person skilled in the art would suggest that making a short circuit of the secondary side resonant circuit 26 is safer than switching from a full-bridge mode to a half-bridge mode such understanding neglects that very high currents are generated during this switching event leading to a new sort of danger. The present invention overcomes this danger.

Further, according to the present invention current stresses in the mobile side rectifier 32 are significantly reduced upon occurrence of a failure due to the fact that the change in voltage is not as large as it is in the case of switching a hard short-circuit.

Another important advantage according to the present invention is that for change of the operative mode of the mobile side rectifier in a minimum configuration only one switching element is needed to bypass or short circuit at least rectifying element in the mobile side rectifier 32 upon occurrence of a failure instead of two switches. This reduces costs and complexity of the system.

Further, it should be noted that according to the change of operative mode in the mobile side rectifier 32 is not restricted in any way and in to one direction only, e.g. from full-bridge mode to half-bridge mode, as long as the operative mode during failure-free operation is different from the target operative mode of the mobile side rectifier 32 used upon occurrence of a failure at the mobile side circuit 24.

In the following different examples for realizing the basic concept of the present invention as outlined above will be explained with reference to FIG. 4 to FIG. 19.

Figure 4:
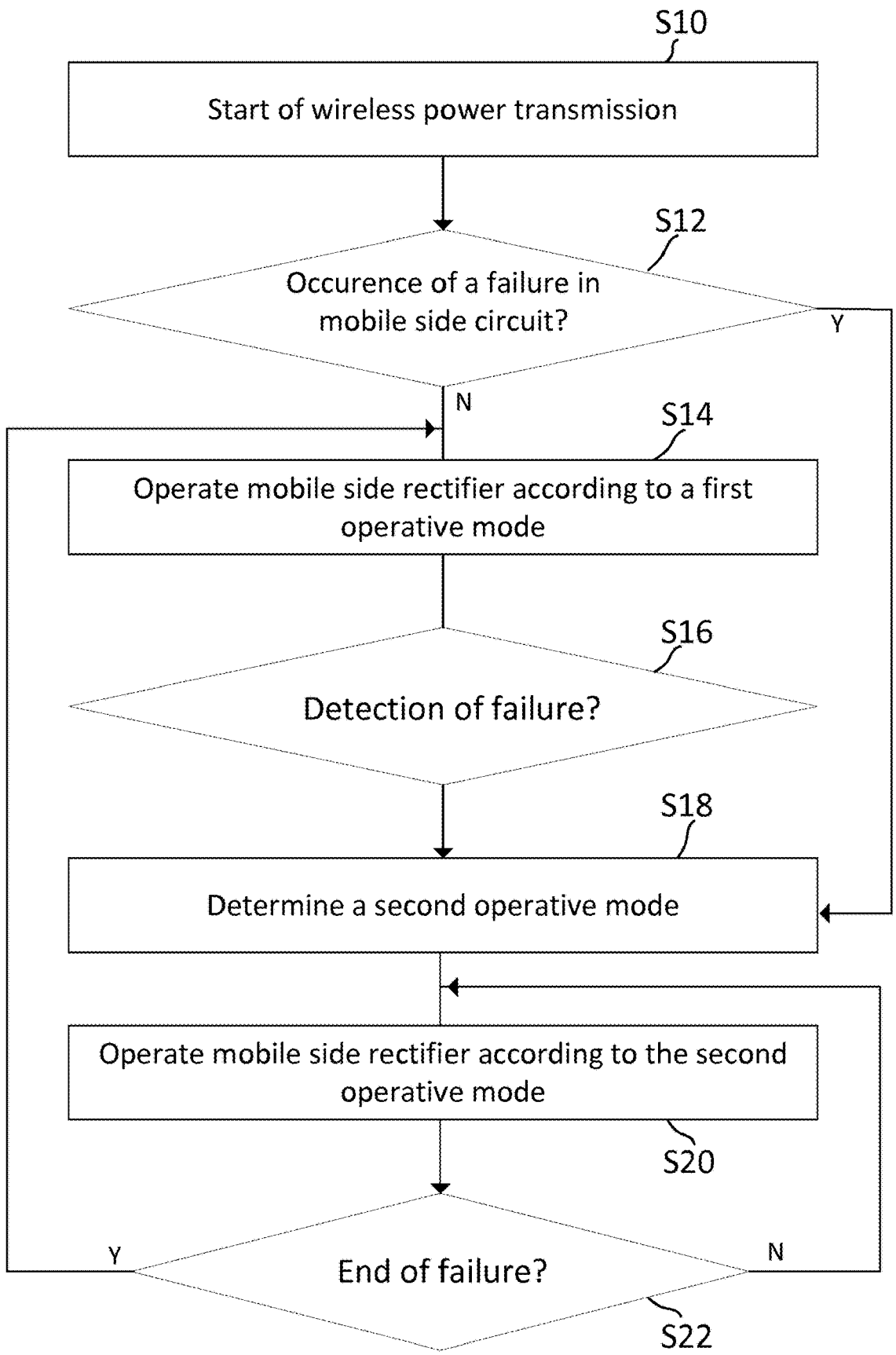
FIG. 4 shows a flowchart of operation for the mobile side circuit of the wireless power transmission system according to the present invention.

FIG. 4 shows a flowchart of operation for the mobile side circuit of the wireless power transmission system according to the present invention.

As shown in FIG. 4, in a step S10, operatively executed by the stationary side circuit 12 under control of the stationary side controller 16 and by the mobile side circuit 24 under control of the mobile side controller 40, the wireless power transmission system 10 starts the wireless power transmission. At this stage, in a step S12, operatively executed by the mobile side failure detector 42 and the mobile side controller 40, it will be checked whether a failure occurs at the mobile side. If so, the failure handling procedure according to the present invention will start and otherwise the process flow proceeds according to standard procedure.

As shown in FIG. 4, in a step S14, operatively executed by the mobile side controller 40, there is determined a first operative mode for the mobile side rectifier 32 according to prevailing operative conditions, e.g., type of load 38, power consumption by the load 38, etc. Then the mobile side rectifier operates in the first operative mode being, e.g., a half-bridge rectification mode or a full bridge rectification mode during failure free operation of the mobile side circuit;

As shown in FIG. 4, in a step S16, operatively executed by the mobile side failure detector 42 and the mobile side controller 40, it will again be checked whether a failure state occurs at the mobile side. Such a check may be implement according to a predetermined interval, upon issuance of a related control signal, or any other suitable condition.

As shown in FIG. 4, if the result of step S16 is that a failure state occurs at the mobile side then there follows a step S18, operatively executed by the mobile side controller 40, to determine the second operative mode which is different from the first operative mode and is selected from a group comprising a half-bridge mode, a full-bridge mode, a DC mode where the voltage across the energy storage circuit 34 is switched through to the input of mobile side rectifier 32 with or without polarity reversion, and an antiphase mode where the input voltage and the input current of the mobile side rectifier 32 are shifted with respect to each other according to a predetermined range.

As shown in FIG. 4, in a step S20, operatively executed by the mobile side controller 40, the mobile side rectifier 32 is operated in the second operative mode. As outlined above and explained in more detail in the following this may be achieved by controlling at least one switching element connected in parallel to at least one rectifying element of the mobile side rectifier 32 to change the first operative mode of the mobile side rectifier 32 to the second operative mode upon occurrence of the failure state in the mobile side circuit.

As shown in FIG. 4, in a step S22, operatively executed by the mobile side failure detector 42 and the mobile side controller 40, it will be checked whether the failure prevails at the mobile side. Such a check may be implemented according to a predetermined interval, upon issuance of a related control signal, or any other suitable condition. If the result of step 22 is negative the operation of the mobile side circuit in the second operative mode will continue and otherwise the procedure will continue with operation of the mobile side circuit 24 in the first operative mode.

It should be noted that according to the present invention the first operative mode may be kept constant, e.g., in full-bridge mode or half-bridge mode, or may change from full-bridge mode to half-bridge mode when the operative conditions during failure free operation of the mobile side require so.

Figure 5:
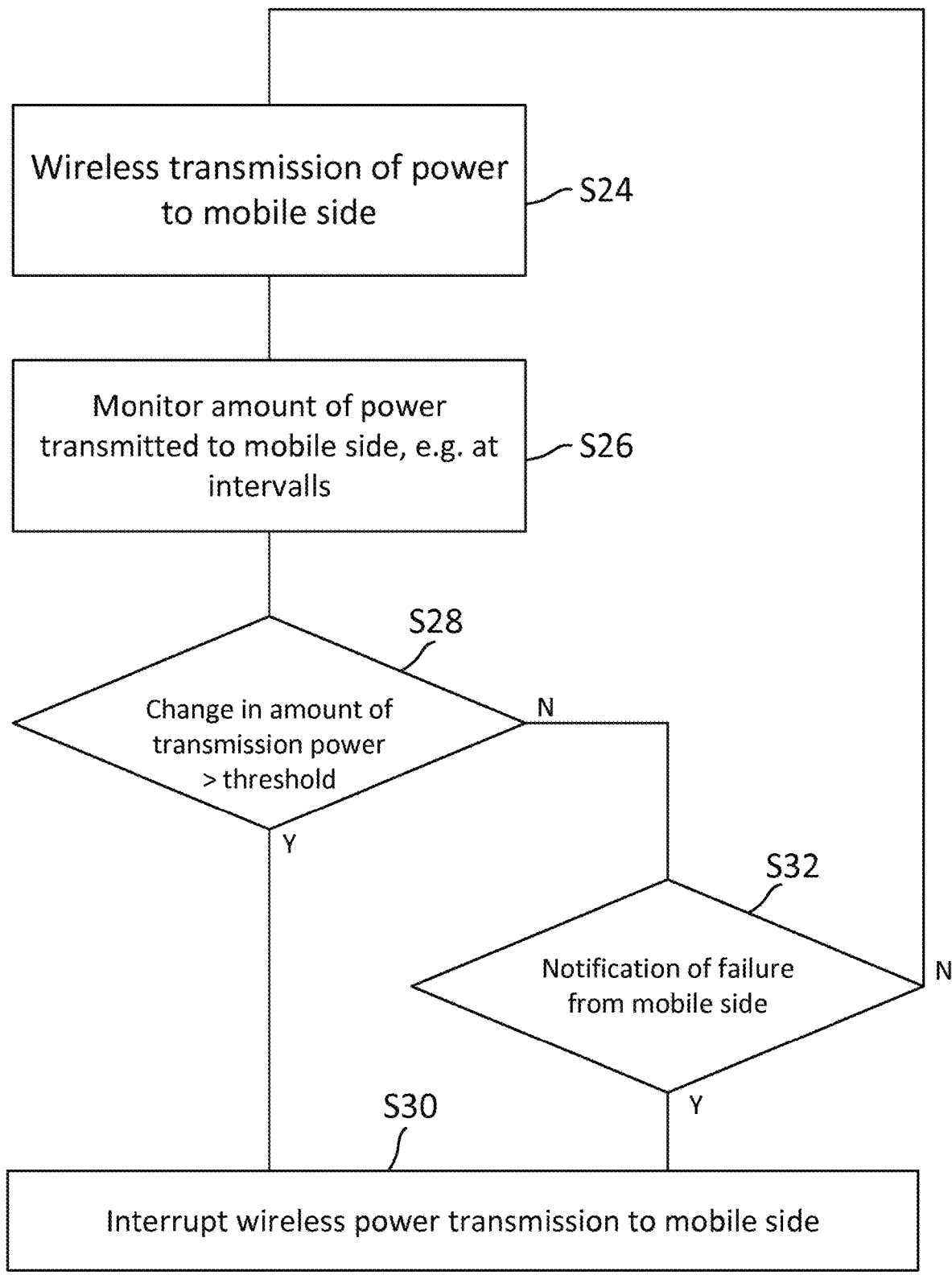
FIG. 5 shows a flowchart of operation for the stationary side circuit of the wireless power transmission system according to the present invention.

FIG. 5 shows a flowchart of operation for the stationary side circuit of the wireless power transmission system according to the present invention.

As shown in FIG. 5 and assuming that the wireless power transmission has started, in a step S24, operatively being controlled by the stationary side controller 16, wireless power transfer takes place from the stationary side to the mobile side. Then in a step S26, operatively executed by the stationary side controller 16, the amount of power transmitted to the mobile side will be monitored. It should be noted that such monitoring may be implemented at regular intervals, at change of operative conditions, or under any other suitable condition.

As shown in FIG. 5, in a step S28, operatively executed by the stationary side controller 16, it will be determined whether the change in the amount of transmission power or current exceeds a predetermined threshold or not. A typical range for the predetermined threshold according to the present invention may lie in the range of 5% to 20%. If the evaluation in step S28 is affirmative, there follows a step S30, operatively executed by the stationary side controller 16, to interrupt wireless power transmission to the mobile side. The interruption of power supply to the mobile side circuit 24 allows to avoid any damage to circuit elements of the mobile side circuit 24 in a very efficient and safe manner.

As shown in FIG. 5 and as an option, if the evaluation in Step S28 is not affirmative, another way to achieve interruption of the power supply to the mobile side circuit 24 is the exchange of a notification of failure state from the mobile side circuit to the stationary side circuit in a step 32, operatively executed by the mobile side controller 40 and the mobile side communication interface 46 as well as the stationary side controller 16 and the stationary side communication interface 48.

In the following different examples for change of operative mode in the mobile side rectifier 32, according to a first embodiment of the present invention will be explained assuming the mobile side rectifier has a full-bridge circuit topology.

Figure 6:
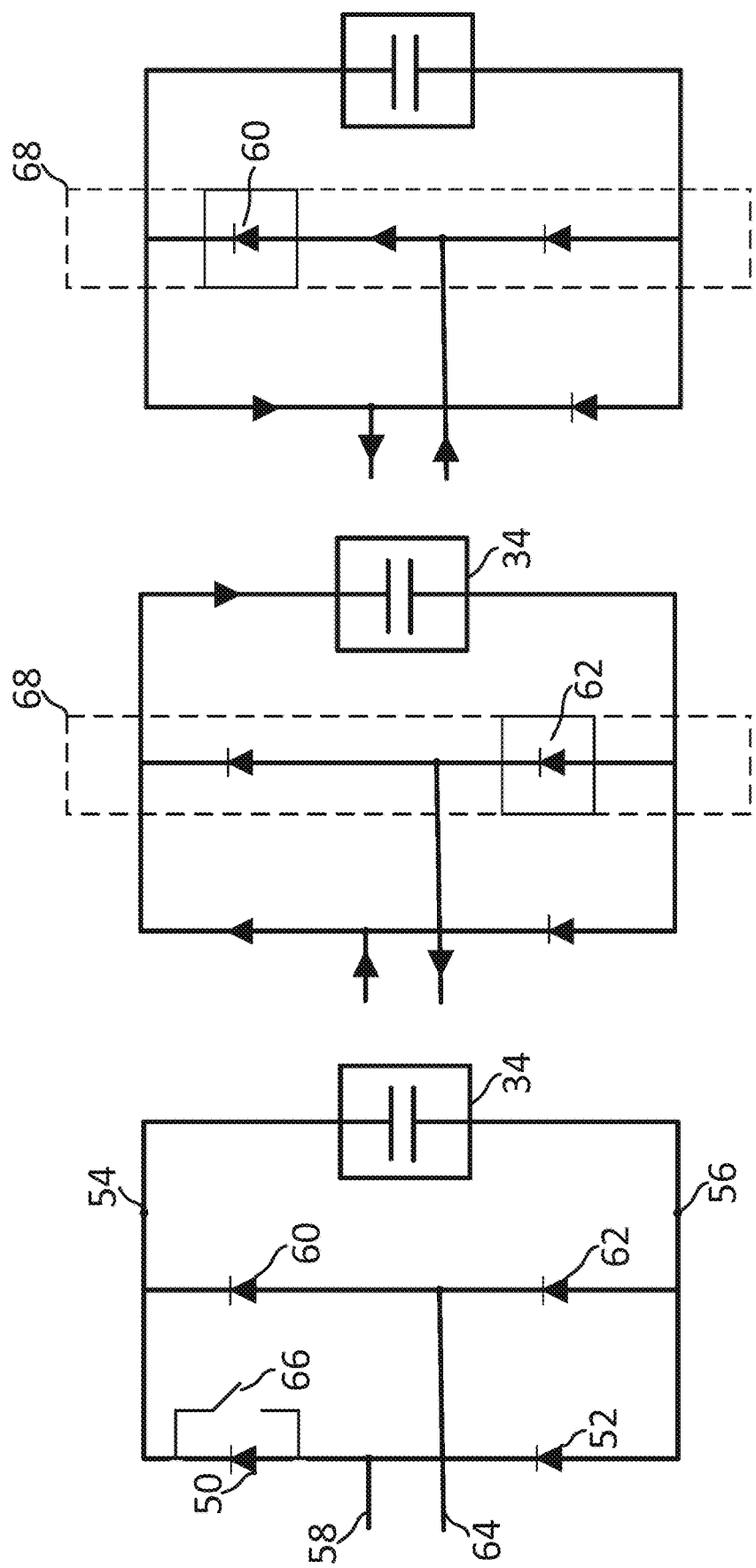
FIG. 6 shows a first example for change of the operative mode of the mobile side rectifier from a full-bridge mode to a half-bridge mode and vice versa according to a first embodiment of the present invention.

FIG. 6 shows a first example for change of the operative mode of the mobile side rectifier 32 from a full-bridge mode to a half-bridge mode and vice versa according to a first embodiment of the present invention.

As shown in FIG. 6, the mobile side rectifier 32 is a full-bridge rectifier and has a first rectifying element 50 and a second rectifying element 52 connected in series between a first output terminal 54 and a second output terminal 56 of the full-bridge rectifier and having a common connection terminal connected to a first input terminal 58 of the full-bridge rectifier.

As shown in FIG. 6, the mobile side rectifier 32 further has a third rectifying element 60 and a fourth rectifying element 62 connected in series between the first output terminal 54 and the second output terminal 56 of the full-bridge rectifier 32 and having a common connection terminal connected to a second input terminal 64 of the full-bridge rectifier.

As shown in FIG. 6, the mobile side rectifier further has a first switching element 66 which is connected in parallel to the first rectifying element 50.

As shown in FIG. 6, assuming that the first rectifying element 50 is bypassed upon occurrence of a failure state in the mobile side circuit 32, then, during a positive half-cycle of the input current to the mobile side rectifier 32, the current flows as shown in the middle illustration of FIG. 6, while during a negative half-cycle of the input current to the mobile side rectifier 32 flows as shown in the right illustration of FIG. 6.

As shown in FIG. 6, during the positive half-cycle of the input current the current flows across the first switching element 66, the energy storage circuit 34 and the fourth rectifying element 62. Otherwise, during the negative half-cycle of the input current the current flows across the third rectifying element 60 and the first switching element 66.

From the above it should be clear that by short circuiting or equivalently by-passing the first rectifying element 50 there is achieved a change of operative mode in the mobile side rectifier from full-bridge mode to half-bridge mode realizing a first half-bridge circuit 68. Also, a short circuit of the mobile side resonant circuit 26 and related excessive transient behavior of voltage and current at the mobile side circuit 24 may be avoided as the current will always flow across one rectifying element of the first half-bridge circuit 68, the first switching element 66 and—during the positive half-cycle—the energy storage circuit 34.

Figure 7:
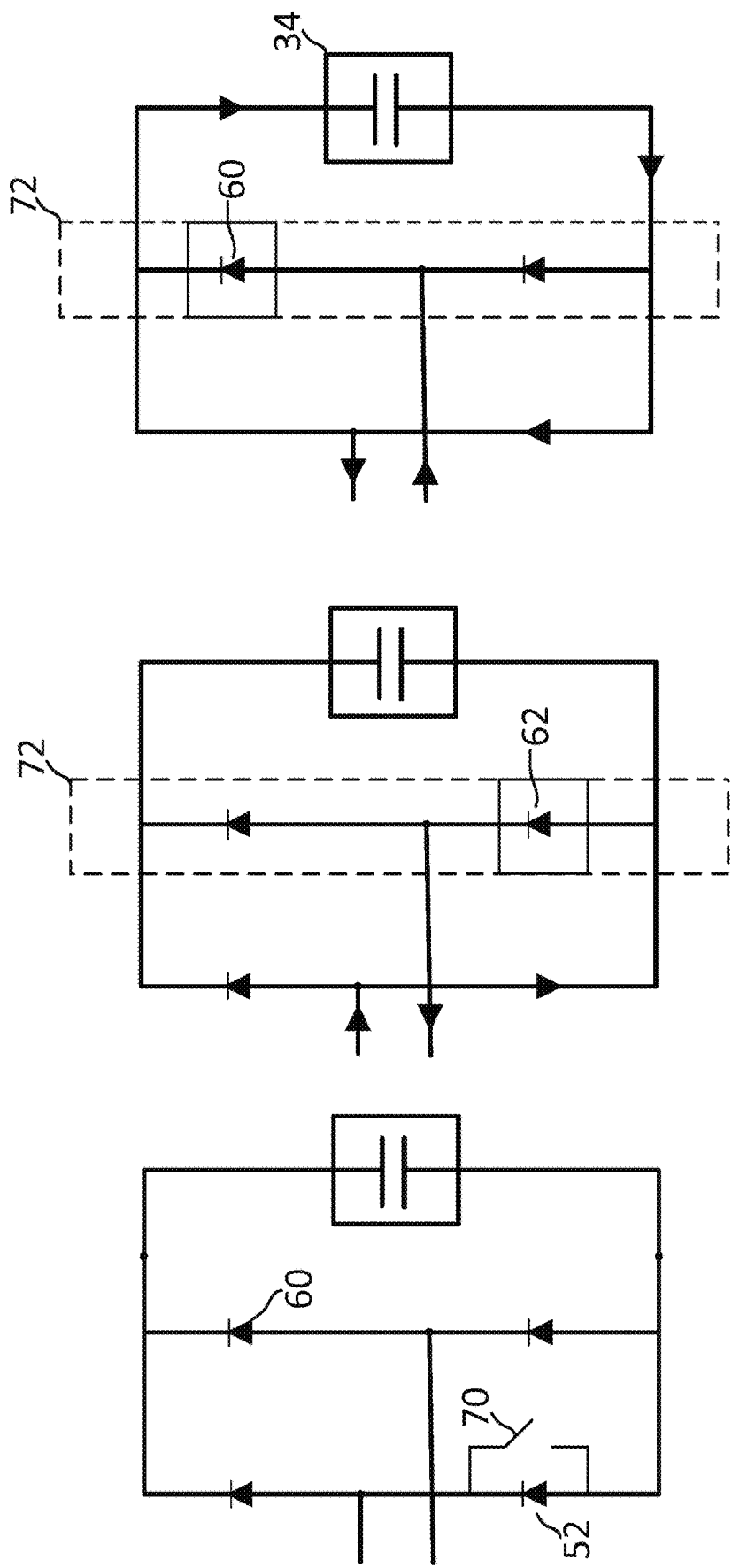
FIG. 7 shows a second example for change of operative mode of the mobile side rectifier from a full-bridge mode to a half-bridge mode and vice versa according to the first embodiment of the present invention.

FIG. 7 shows a second example for change of operative mode of the mobile side rectifier from a full-bridge mode to a half-bridge mode and vice versa according to the first embodiment of the present invention.

The basic circuit topology for the mobile rectifier circuit 32 shown in FIG. 7 is similar to the one outlined above with respect to FIG. 6, the difference being that a second switching element 70 is connected to the second rectifying element 52.

As shown in FIG. 7, assuming that the second rectifying element 52 is bypassed upon occurrence of a failure state in the mobile side circuit 32 then during a positive half-cycle of the input current to the mobile side rectifier 32 the current flows as shown in the middle illustration of FIG. 7, while during a negative half-cycle of the input current to the mobile side rectifier 32 flows as shown in the right illustration of FIG. 7.

As shown in FIG. 7, during the positive half-cycle of the input current the current flows across the second switching element 70 and the fourth rectifying element 62. Otherwise, during the negative half-cycle of the input current the current flows across the third rectifying element 60 and the energy storage circuit 34, and the second switching element 70.

From the above, it should be clear that by short circuiting or equivalently by-passing the second rectifying element 52 there is achieved a change of operative mode in the mobile side rectifier from full-bridge mode to half-bridge mode realizing a second half-bridge circuit 72. Further, the effects achieved according to the example shown in FIG. 7 are the same as explained above with respect to FIG. 6.

Figure 8:
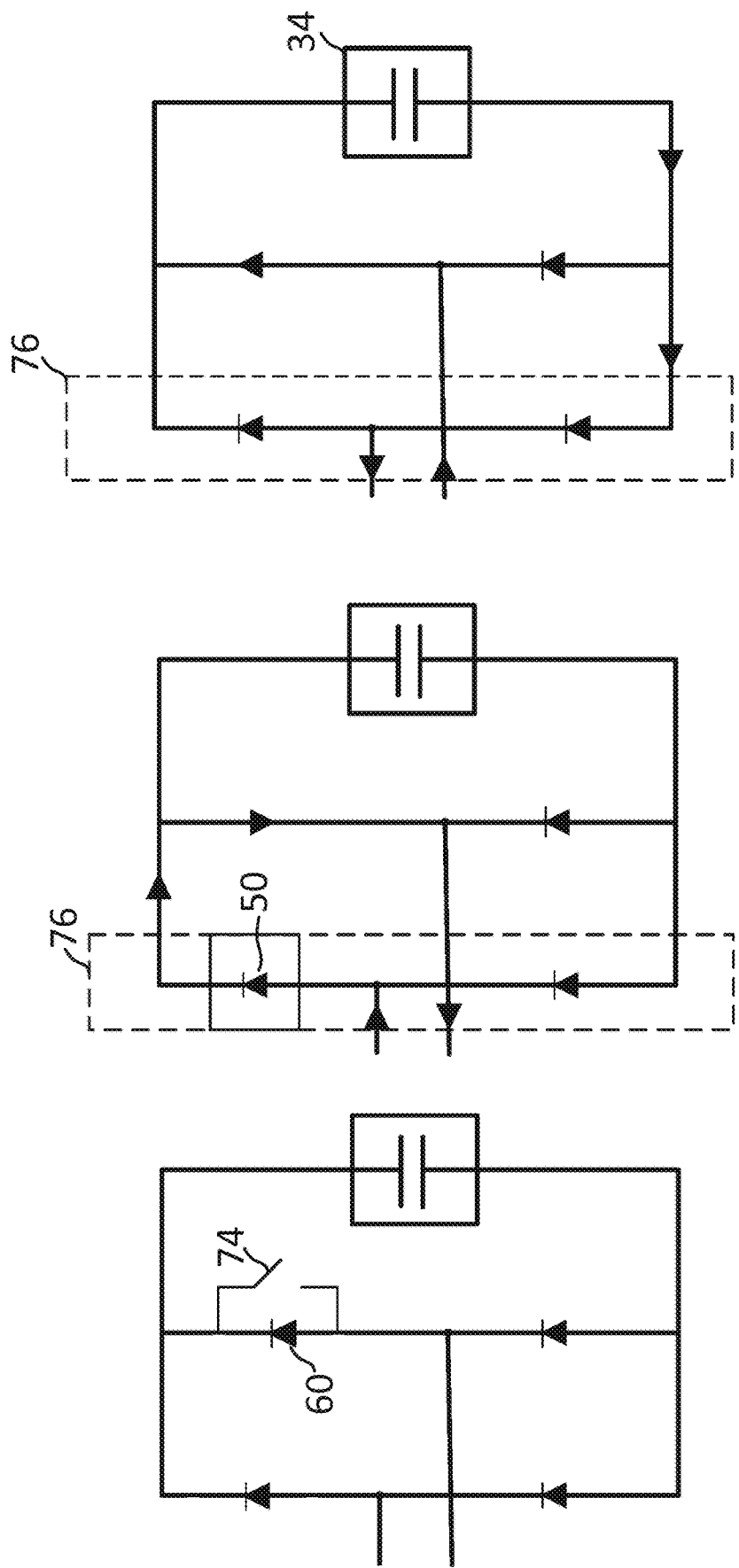
FIG. 8 shows a third example for change of operative mode of the mobile side rectifier from a full-bridge mode to a half-bridge mode and vice versa according to the first embodiment of the present invention.

FIG. 8 shows a third example for change of operative mode of the mobile side rectifier from a full-bridge mode to a half-bridge mode and vice versa according to the first embodiment of the present invention.

The basic circuit topology for the mobile rectifier circuit 32 shown in FIG. 8 is similar to the one outlined above with respect to FIG. 6, the difference being that a third switching element 74 is connected to the third rectifying element 60.

As shown in FIG. 8, assuming that the third rectifying element 60 is bypassed upon occurrence of a failure state in the mobile side circuit 32 then during a positive half-cycle of the input current to the mobile side rectifier 32 the current flows as shown in the middle illustration of FIG. 8, while during a negative half-cycle of the input current to the mobile side rectifier 32 flows as shown in the right illustration of FIG. 8.

As shown in FIG. 8, during the positive half-cycle of the input current the current flows across the first rectifying element 50 and the third switching element 74. Otherwise, during the negative half-cycle of the input current the current flows across the third switching element 74, the energy storage circuit 34, and the second rectifying element 52.

From the above it should be clear that by short circuiting or equivalently by-passing the third rectifying element 60 there is achieved a change of operative mode in the mobile side rectifier from full-bridge mode to half-bridge mode realizing a third half bridge circuit 76. Further, the effects achieved according to the example shown In FIG. 8 are the same as explained above with respect to FIG. 6.

Figure 9:
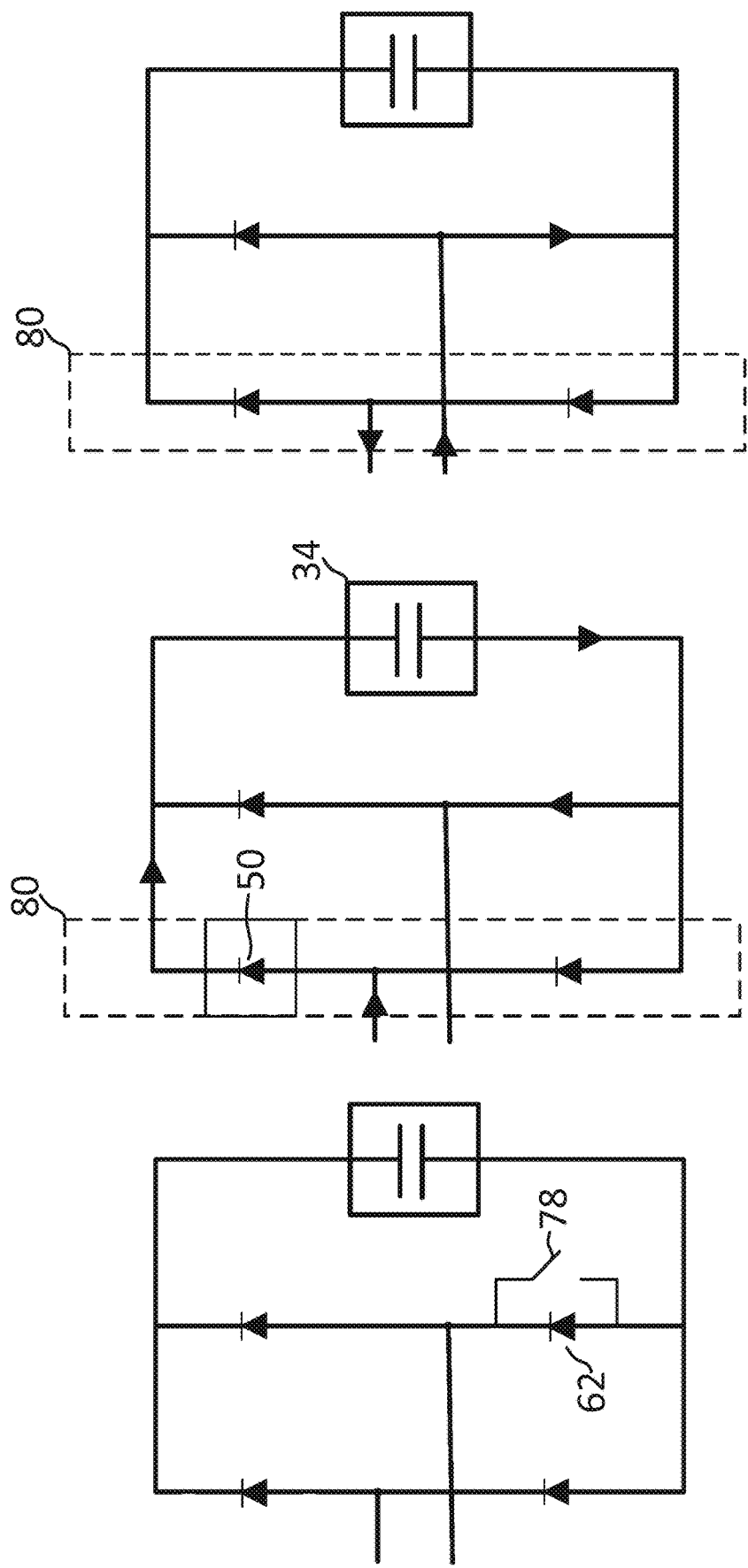
FIG. 9 shows a fourth example for change of operative mode of the mobile side rectifier from a full-bridge mode to a half-bridge mode and vice versa according to the first embodiment of the present invention.

FIG. 9 shows a fourth example for change of operative mode of the mobile side rectifier from a full-bridge mode to a half-bridge mode and vice versa according to the first embodiment of the present invention.

The basic circuit topology for the rectifier circuit shown in FIG. 9 is similar to the one outlined above with respect to FIG. 6, the difference being that a fourth switching element 78 is connected to the fourth rectifying element 62.

As shown in FIG. 9, assuming that the fourth rectifying element 62 is bypassed upon occurrence of a failure state in the mobile side circuit 32 then during a positive half-cycle of the input current to the mobile side rectifier 32 the current flows as shown in the middle illustration of FIG. 9, while during a negative half-cycle of the input current to the mobile side rectifier 32 flows as shown in the right illustration of FIG. 9.

As shown in FIG. 9, during the positive half-cycle of the input current the current flows across the first rectifying element 50, the energy storing unit 34 and the fourth switching element 78. Otherwise, during the negative half-cycle of the input current the current flows across the fourth switching element 78 and the second rectifying element 52.

From the above, it should be clear that by short circuiting or equivalently by-passing the fourth rectifying element 62 there is achieved a change of operative mode in the mobile side rectifier from full-bridge mode to half-bridge mode realizing a fourth half bridge circuit 80. Further, the effects achieved according to the example shown In FIG. 8 are the same as explained above with respect to FIG. 6.

Figure 10:
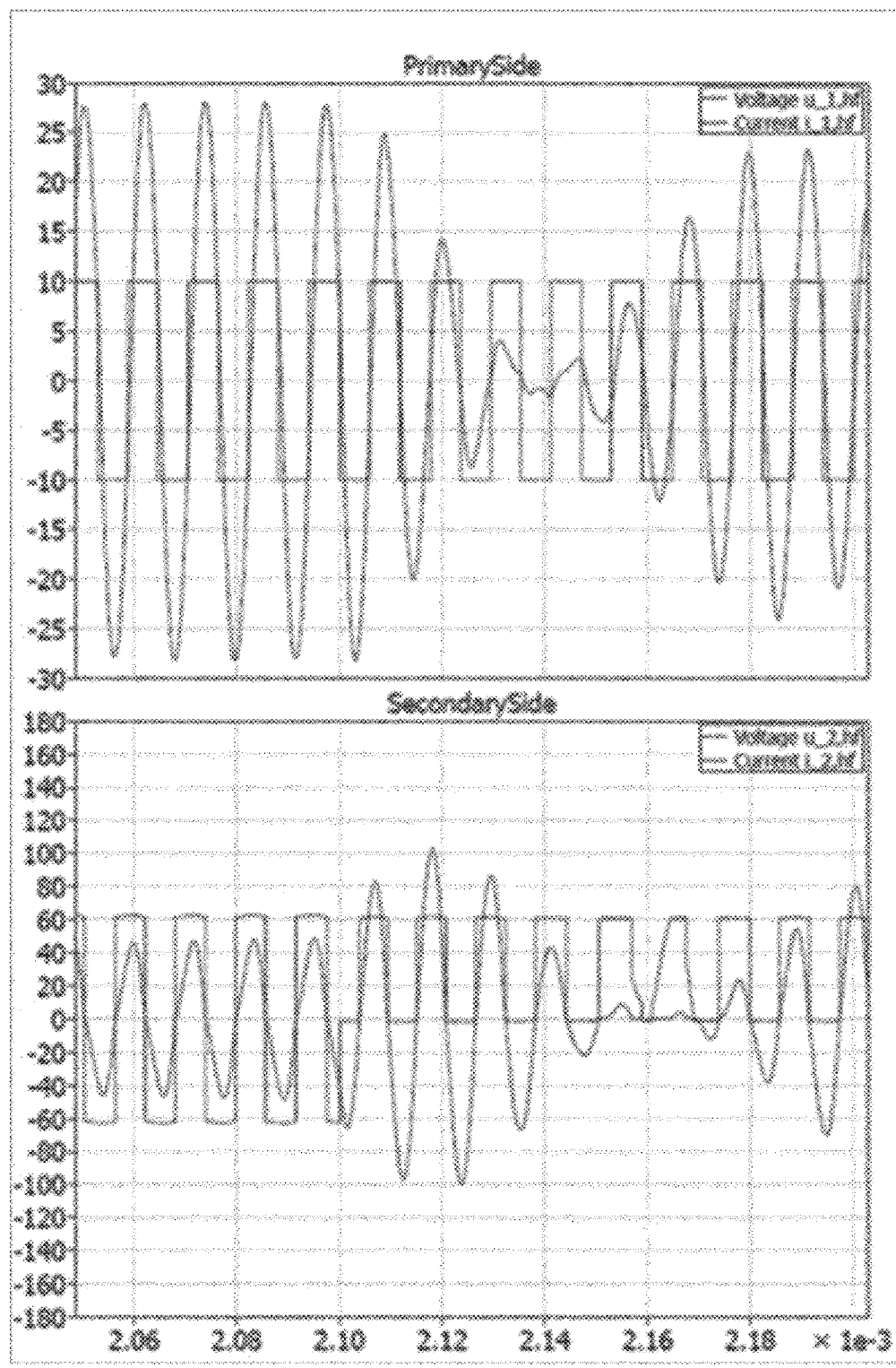
FIG. 10 shows a signal diagram of voltage and current at the stationary side circuit and the mobile side circuit upon change of operative mode of the mobile side rectifier from a full-bridge mode to a half-bridge mode and vice versa according to the first embodiment of the present invention.

FIG. 10 shows a signal diagram for voltage and current at the stationary side circuit 12 and the mobile side circuit 24 upon change of operative mode of the mobile side rectifier from a full-bridge mode to a half-bridge mode and vice versa according to the first embodiment of the present invention.

Figure 2:
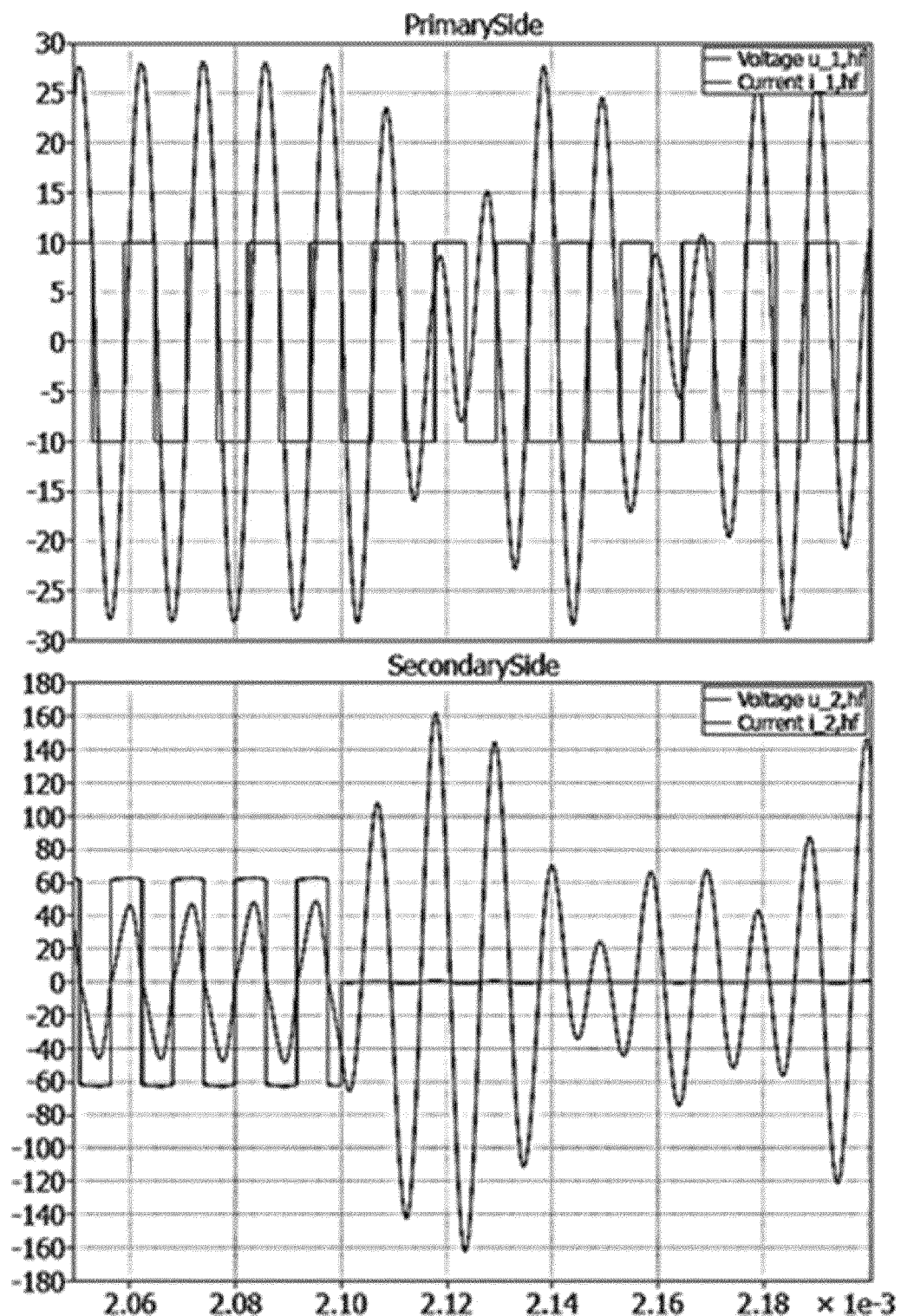
FIG. 2 shows voltage and current waveforms after establishing a short circuit of the mobile side resonant circuit of the mobile side circuit for a series-series-compensated inductive power transmission system.

As shown in FIG. 10, compared to the constellation shown in FIG. 2 according to the present invention the transient behavior of voltage and current shows significantly reduced overshoot and thus achieves a related reduced load on the circuit elements of the mobile side circuit 24. As shown in FIG. 10, current stresses in the mobile rectifier circuit 32 are avoidable compared to the hard short circuit scenario as neither high currents nor high voltages are generated.

Figure 11:
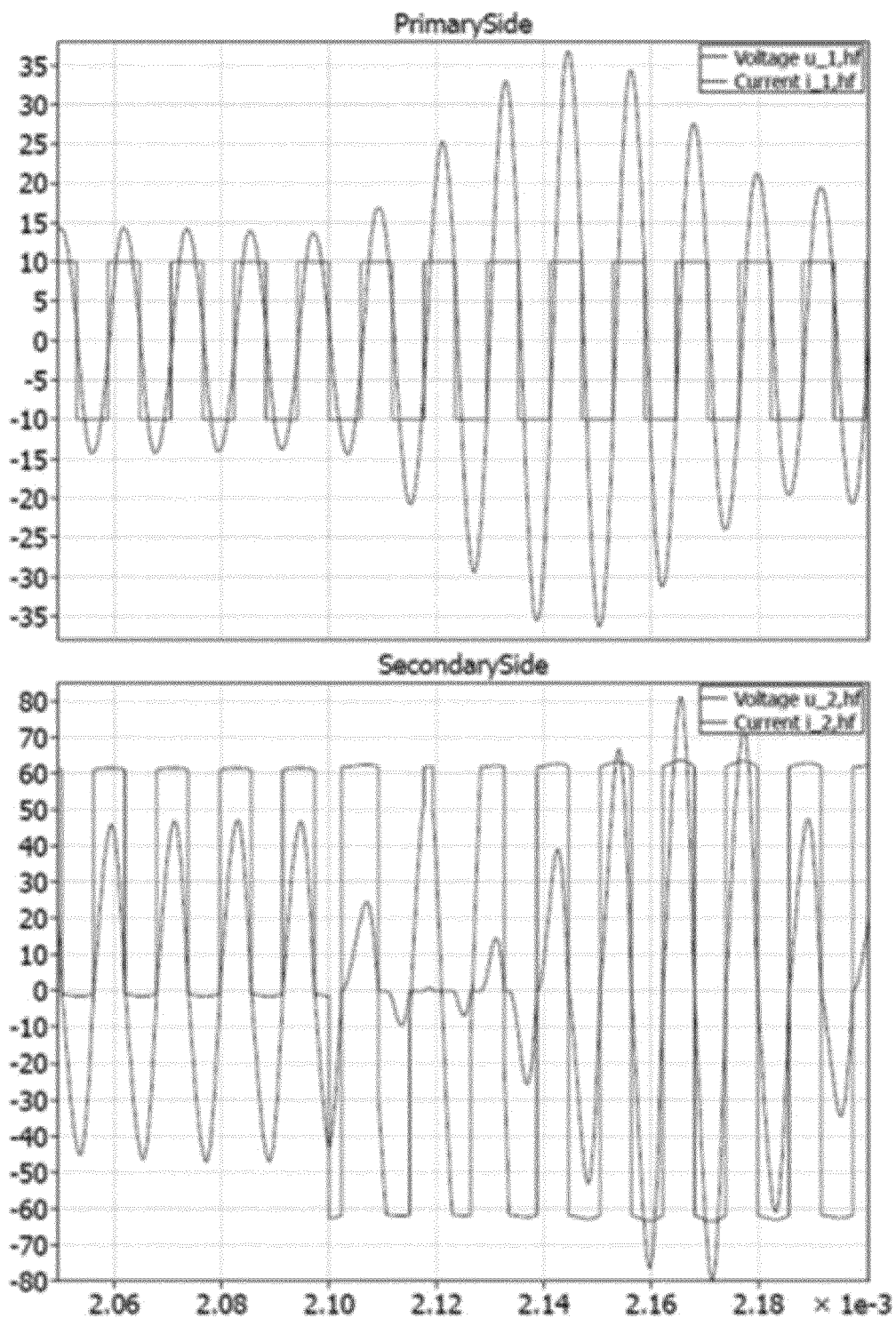
FIG. 11 shows a signal diagram of voltage and current at the stationary side circuit and the mobile side circuit upon change of operative mode of the mobile side rectifier from a half-bridge mode to a full-bridge mode and vice versa according to the first embodiment of the present invention.

FIG. 11 shows a signal diagram for voltage and current at the stationary side circuit 12 and the mobile side circuit 24 upon change of operative mode of the mobile side rectifier 32 from a half-bridge mode to a full-bridge mode and vice versa according to the first embodiment of the present invention.

As shown in FIG. 11, the present invention leads to similar results as shown in FIG. 10 when a change of operation mode for the mobile resonant circuit 32 is from a half-bridge mode to a full-bridge mode.

Further, the example shown in FIG. 11 is related to the scenario illustrated above with respect to FIG. 5 where the stationary side controller 16 detects increase of power supply to the mobile side circuit 32 or receives a notification of failure occurrence at the mobile side circuit 32 to then interrupt wireless power transfer to the mobile side circuit 32.

In the following different examples for change of operative mode in the mobile side rectifier 32 according to a second embodiment of the present invention will be explained assuming that the mobile side rectifier has a full-bridge circuit topology. The difference with respect to the examples illustrated above with respect to FIG. 6 to FIG. 10 is that in the examples to follow there are provided two switching elements for change of operative mode of the mobile side rectifier 32.

Figure 12:
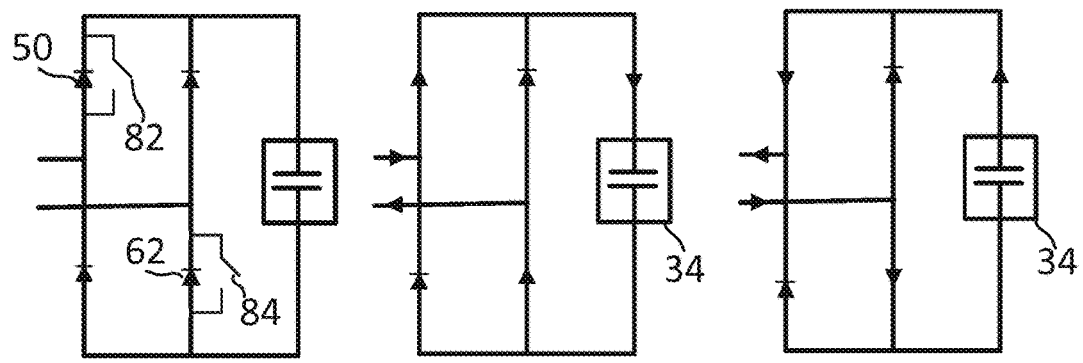
FIG. 12 shows a first example for change of the operative mode of the mobile side rectifier from a full-bridge mode to a DC mode a without polarity reversion and vice versa according to a second embodiment of the present invention.

FIG. 12 shows a first example for change of the operative mode of the mobile side rectifier 32 from a full-bridge mode to a DC mode without polarity reversion and vice versa according to a second embodiment of the present invention.

As shown in FIG. 12, the mobile side rectifier 32 comprises one switching element 82 connected in parallel to the first rectifying element 50 and one switching element 84 connected in parallel to the fourth rectifying element 62.

Operatively, the mobile side control circuit 40 is adapted to close or open simultaneously the switching element 82 connected in parallel to the first rectifying element 50 and the switching element 84 connected in parallel to the fourth rectifying element 62 upon occurrence of a failure state in the mobile side circuit 32.

As shown in FIG. 12, assuming that the first rectifying element 50 and the fourth rectifying element 62 are bypassed upon occurrence of a failure state in the mobile side circuit 32 then during a positive half-cycle of the input current to the mobile side rectifier 32 the current flows as shown in the middle illustration of FIG. 12, while during a negative half-cycle of the input current to the mobile side rectifier 32 flows as shown in the right illustration of FIG. 12.

As shown in FIG. 12, during the positive half-cycle of the input current the current flows across the switching element 82 connected in parallel to the first rectifying element 50, the energy storage circuit 34, and the switching element 84 connected in parallel to the fourth rectifying element 50. Further, during the negative half-cycle of the input current the current flows across the switching element 84 connected in parallel to the fourth rectifying element 62, the energy storage circuit 34, and the switching element 82 connected in parallel to the first rectifying element 50.

Figure 13:
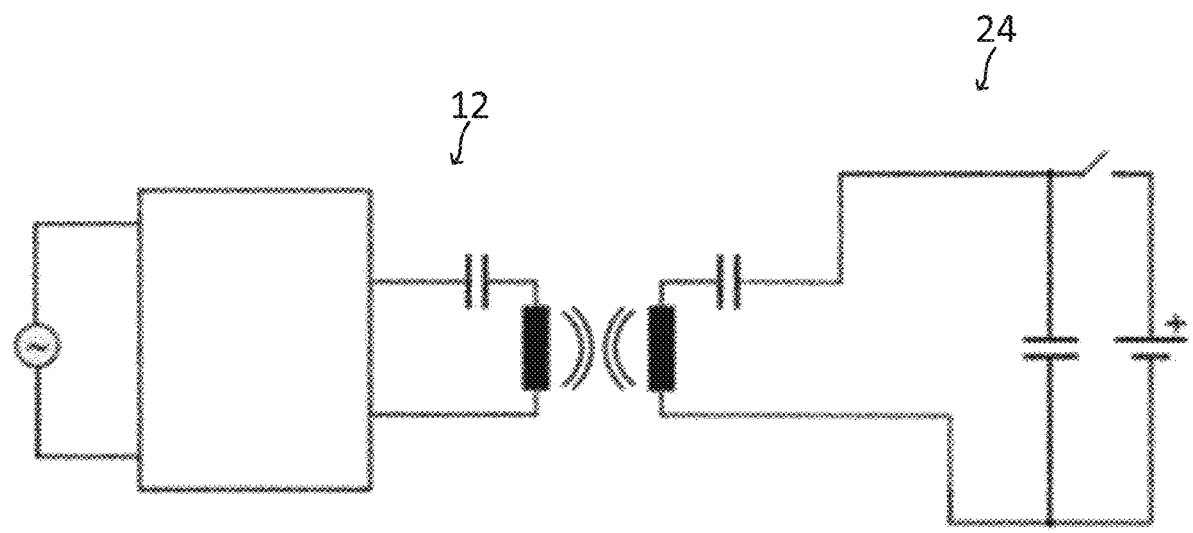
FIG. 13 shows an equivalent schematic diagram for the change of the operative mode of the mobile side rectifier from a full-bridge mode to a DC mode without polarity reversion as shown in FIG. 12.

FIG. 13 shows an equivalent schematic diagram for the change of the operative mode of the mobile side rectifier from a full-bridge mode to a DC mode without polarity reversion as shown in FIG. 12.

As shown in FIG. 13, to change the second operative mode to the DC-mode without polarity reversal of the voltage across the energy storage circuit 34. By switching on both switching elements 82 and 84 the power transfer to the load 38 is interrupted immediately. The secondary resonant circuit is connected to a DC-voltage which is equal to the voltage of the energy storage circuit 34. Optionally, the stationary side circuit 12 of the wireless power transmission system detects this event and shuts down the power supply of the from the stationary side circuit 12 to the mobile side circuit 24.

Figure 14:
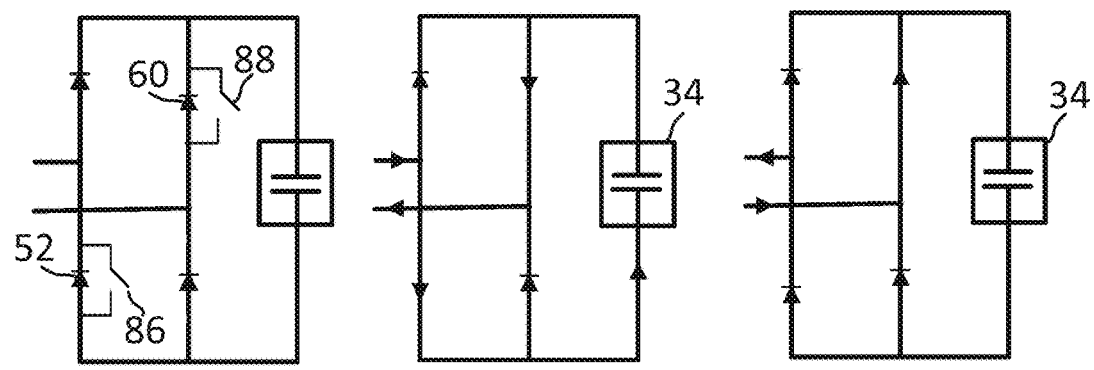
FIG. 14 shows a second example for change of the operative mode of the mobile side rectifier from a full-bridge mode to a DC mode a with polarity reversion and vice versa according to the second embodiment of the present invention.

FIG. 14 shows a second example for change of the operative mode of the mobile side rectifier from a full-bridge mode to a DC mode with polarity reversion and vice versa according to the second embodiment of the present invention.

As shown in FIG. 14, the mobile side rectifier 32 comprises one switching element 86 connected in parallel to the second rectifying element 52 and one switching element 88 connected in parallel to the third rectifying element 60.

Operatively, the mobile side control circuit 40 is adapted to close or open simultaneously the switching element 86 connected in parallel to the second rectifying element 52 and the switching element 88 connected in parallel to the third rectifying element 60 upon occurrence of a failure state in the mobile side circuit 32.

As shown in FIG. 14, assuming that the second rectifying element 52 and the third rectifying element 60 are bypassed upon occurrence of a failure state in the mobile side circuit 32 then during a positive half-cycle of the input current to the mobile side rectifier 32 the current flows as shown in the middle illustration of FIG. 14, while during a negative half-cycle of the input current to the mobile side rectifier 32 flows as shown in the right illustration of FIG. 14.

As shown in FIG. 14, during the positive half-cycle of the input current the current flows across the switching element 86 connected in parallel to the second rectifying element 52, the energy storage circuit 34, and the switching element 88 connected in parallel to the third rectifying element 60. Further, during the negative half-cycle of the input current the current flows across the switching element 88 connected in parallel to the third rectifying element 60, the energy storage circuit 34, and the switching element 86 connected in parallel to the second rectifying element 52.

Figure 15:
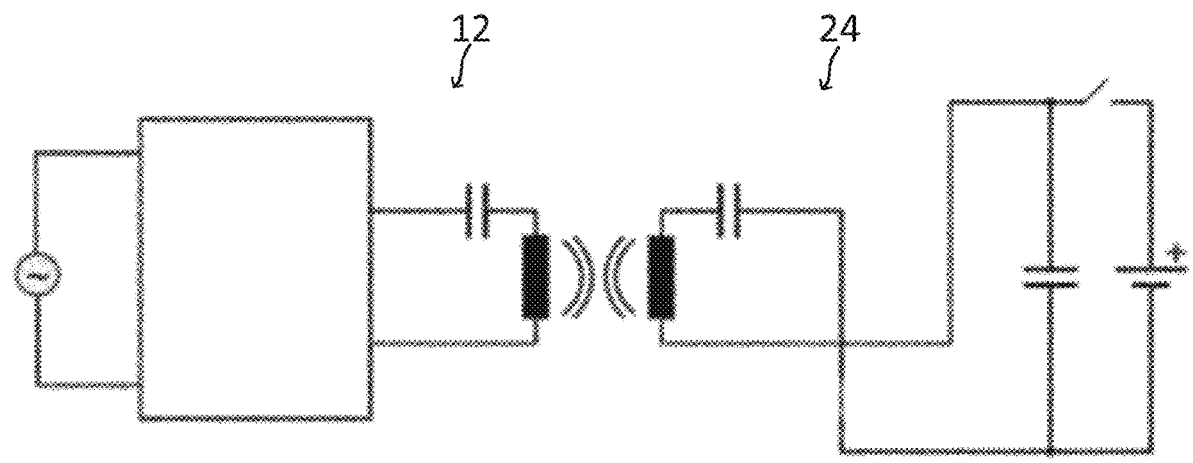
FIG. 15 shows an equivalent schematic diagram for the for change of the operative mode of the mobile side rectifier from a full-bridge mode to a DC mode with polarity reversion as shown in FIG. 14.

FIG. 15 shows an equivalent schematic diagram for the change of the operative mode of the mobile side rectifier from a full-bridge mode to a DC mode with polarity reversion as shown in FIG. 14.

As shown in FIG. 15, the difference between the first example of the second embodiment of the present invention explained above with respect to FIG. 12 and FIG. 13 and the second example of the second embodiment of the present invention explained with respect to FIG. 13 and FIG. 14 is a DC mode where the voltage across the energy storage circuit 34 is mapped to the input terminals of the rectifier circuit 32 with polarity reversal. Also, here, the mobile side resonant circuit 26 is never short circuited so that similar effects as outlined above for the first example of the second embodiment of the present invention may be achieved for the second example of the second embodiment of the present invention.

In the following, different examples for change of operative mode in the mobile side rectifier 32 according to a third embodiment of the present invention will be explained assuming that the mobile side rectifier has a full-bridge circuit topology. The difference with respect to the examples illustrated above with respect to FIG. 6 to FIG. 10 is that in the examples to follow there are provided four switching elements for change of operative mode of the mobile side rectifier 32.

Figure 16:
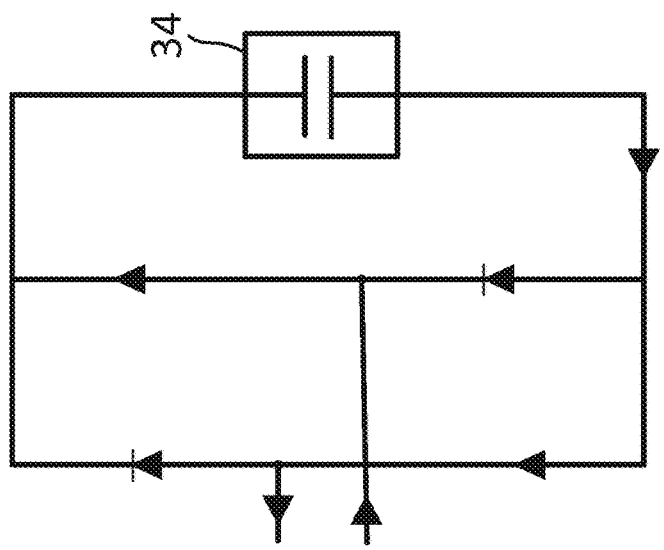
FIG. 16 shows an example for change of the operative mode of the mobile side rectifier from a full-bridge mode to an antiphase mode and vice versa according to a third embodiment of the present invention.
Figure 16:
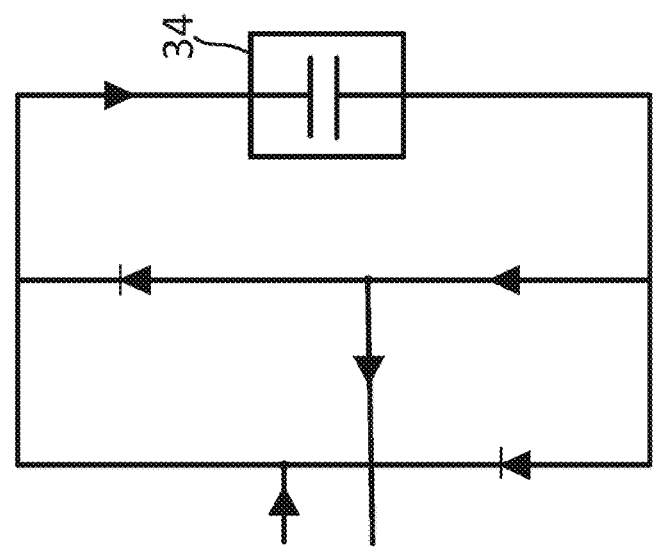
Figure 16:
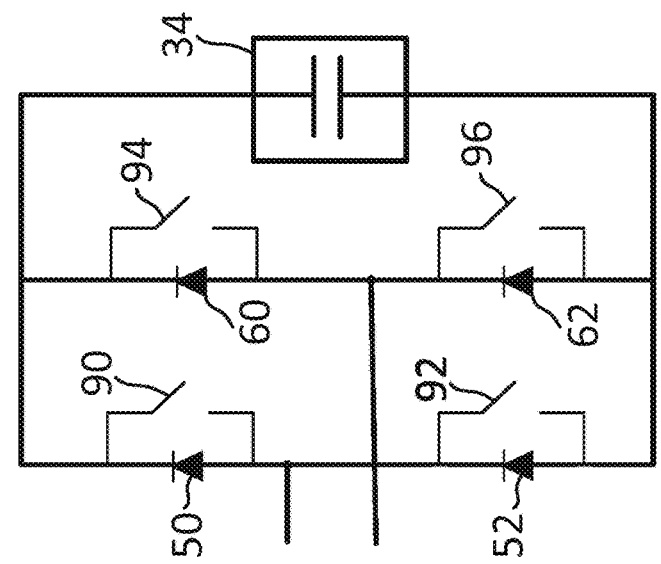

FIG. 16 shows an example for change of the operative mode of the mobile side rectifier 32 from a full-bridge mode to an antiphase mode and vice versa according to a third embodiment of the present invention.

As shown in FIG. 16, according to the third embodiment of the resent invention the mobile side rectifier 32 has one switching element 90 connected in parallel to the first rectifying element 50, one switching element 92 connected in parallel to the second rectifying element 52, one switching element 94 connected in parallel to the third rectifying element 60, and one switching element 96 connected in parallel to the fourth rectifying element 62.

Operatively, the mobile side control circuit 40 is adapted to implement the antiphase mode by simultaneously closing the switching element 90 connected in parallel to the first rectifying element 50 and the switching element 96 connected in parallel to the fourth rectifying element 62 and opening the switching element 92 connected in parallel to the second rectifying element 52 and the switching element 94 connected in parallel the third rectifying element 60 during a negative cycle of the current from the mobile side resonant circuit 26.

Further, operatively, the mobile side control circuit 40 is adapted to implement the antiphase mode by simultaneously closing the switching element 92 connected in parallel to the second rectifying element 52 and the switching element 94 connected in parallel to the third rectifying element 60 and opening the switching element 90 connected in parallel to the first rectifying element 50 and the switching element 96 connected in parallel to the fourth rectifying element 62 during a positive cycle of the current from the mobile side resonant circuit 26.

As shown in FIG. 16, assuming that the first rectifying element 50 and the fourth rectifying element 62 are bypassed upon occurrence of a failure state in the mobile side circuit 32 then during a negative half-cycle of the input current to the mobile side rectifier 32 the current flows as shown in the middle illustration of FIG. 16 while during a positive half-cycle of the input current to the mobile side rectifier 32 flows as shown in the right illustration of FIG. 16.

As shown in FIG. 16, during the negative half-cycle of the input current the current flows across the switching element 92 connected in parallel to the first rectifying element 50, the energy storage circuit 34, and the switching element 96 connected in parallel to the fourth rectifying element 62. Further, during the positive half-cycle of the input current the current flows across the switching element 94 connected in parallel to the third rectifying element 60, the energy storage circuit 34, and the switching element 96 connected in parallel to the fourth rectifying element 62.

Figure 17:
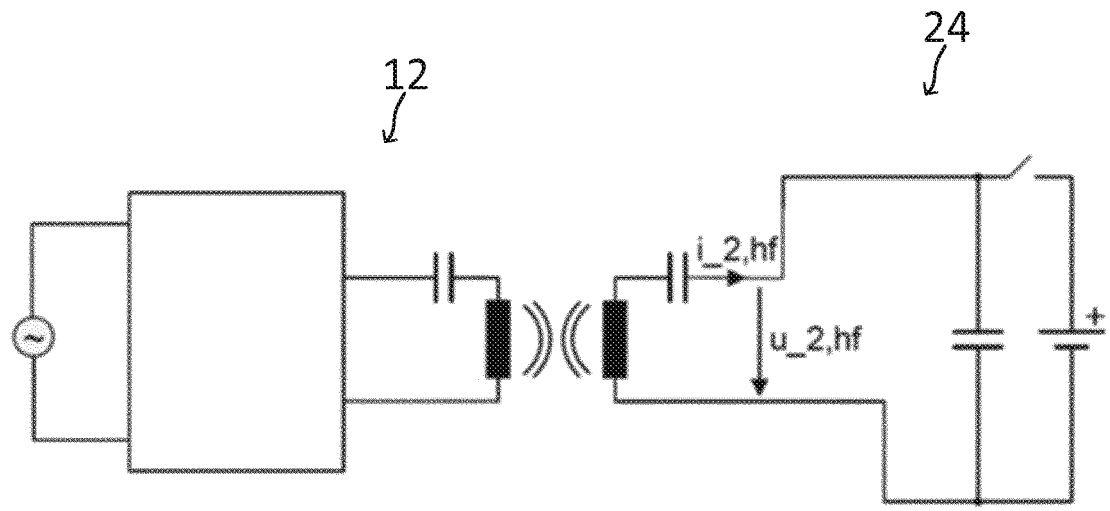
FIG. 17 shows an equivalent schematic diagram for the for change of the operative mode of the mobile side rectifier from a full-bridge mode to the antiphase mode as shown in FIG. 16 for a negative cycle of the input current to the mobile side rectifier.

FIG. 17 shows an equivalent schematic diagram for the for change of the operative mode of the mobile side rectifier from a full-bridge mode to the antiphase mode as shown in FIG. 16 for a negative cycle of the input current to the mobile side rectifier.

As shown in FIG. 17, in the case of occurrence of a failure state in the mobile side circuit 32, the four switching elements 90, 92, 94, 96 create a voltage $u\_2,hf$ which has a 180° phase shift in comparison to the current $i\_2,hf$, i.e. create a positive voltage $u\_2,hf$ during a negative half cycle of the current $i\_2,hf$. Thus, energy will be transferred back to the stationary side where the stationary side controller 15 may detect this event and shut down the supply of power the stationary side resonant circuit 26 and thus also to the mobile side circuit 24.

Figure 18:
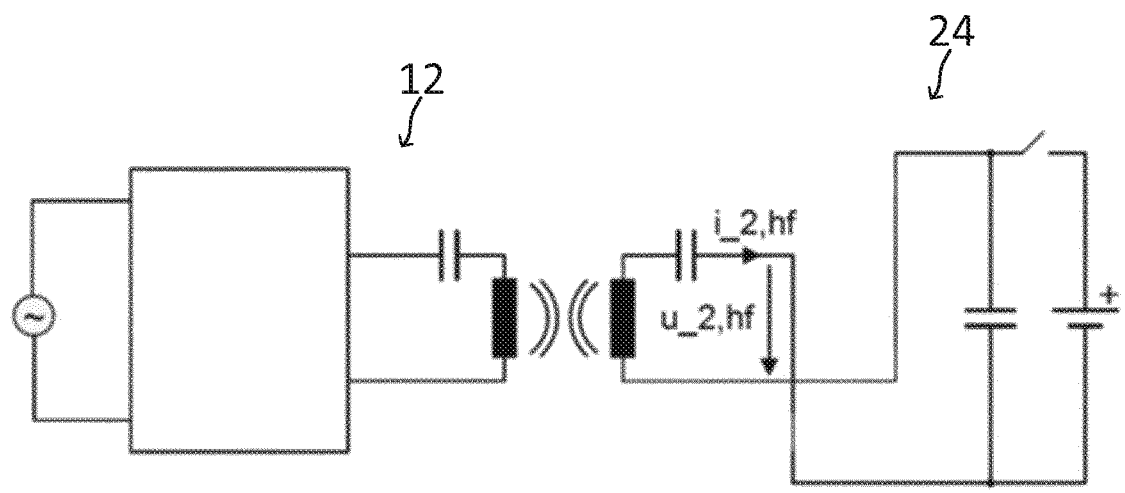
FIG. 18 shows an equivalent schematic diagram for the for change of the operative mode of the mobile side rectifier from a full-bridge mode to the antiphase mode as shown in FIG. 16 for a positive cycle of the input current to the mobile side rectifier.

FIG. 18 shows an equivalent schematic diagram for the change of the operative mode of the mobile side rectifier from a full-bridge mode to the antiphase mode as shown in FIG. 16 for a positive cycle of the input current to the mobile side rectifier.

As shown in FIG. 18, in the case of occurrence of a failure state in the mobile side circuit 32, the four switching elements 90, 92, 94, 96 create a voltage $u\_2,hf$ which has a 180° phase shift in comparison to the current $i\_2,hf$, i.e. create a negative voltage $u\_2,hf$ during a positive half cycle of the current $i\_2,hf$. Thus, also during the positive half cycle of the current $i\_2,hf$ energy will be transferred back to the stationary side. Again, the stationary side controller 16 may shut down the supply of power to the mobile side circuit 24.

It should be noted that according to the present invention the phase shift between the voltage $u\_2,hf$ and the current $i\_2,hf$ is not restricted to a value of 180°. Generally, according to the present invention the mobile side controller 40 may be adapted to control the switching elements 90, 92, 94, 96 to create a voltage $u\_2,hf$ which has a phase shift in comparison to the current $i\_2,hf$ which lies in the range of 180°±30°. As an alternative the phase shift may lie in the range of 90°±30° which leads to a reduced power transfer to the mobile side circuit while at the same time reducing the stress on related circuit elements compared to the range of 180°±30°.

In the following an example for change of operative mode in the mobile side rectifier 32 according to a fourth embodiment of the present invention will be explained assuming the mobile side rectifier has a half-bridge circuit topology.

Figure 19:
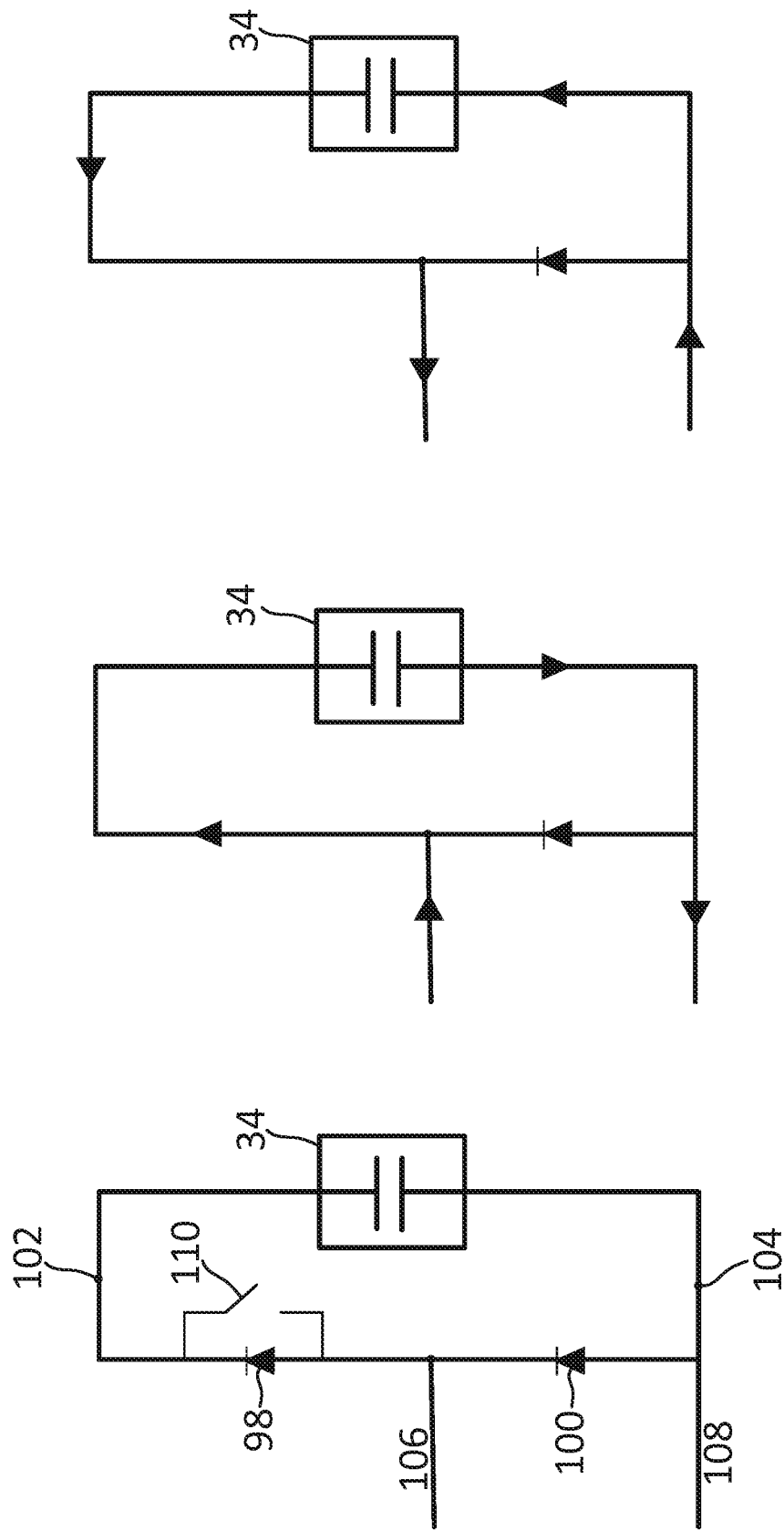
FIG. 19 shows an example change of the operative mode of the mobile side rectifier from a half-bridge mode to the DC mode without polarity reversal and vice versa upon occurrence of a failure at the mobile side according to a fourth embodiment of the present invention.

FIG. 19 shows an example change of the operative mode of the mobile side rectifier from a half-bridge mode to the DC mode without polarity reversal and vice versa upon occurrence of a failure at the mobile side according to a fourth embodiment of the present invention.

As shown in FIG. 19, according to the fourth embodiment of the present invention the mobile side rectifier (32) is a half-bridge rectifier having a first rectifying element 98 and a second rectifying element 100 connected in series between a first output terminal 102 and a second output terminal 104 of the half-bridge rectifier and having a common connection terminal connected to a first input terminal 106 of the half-bridge rectifier and having the connection terminal of the second rectifying element different from the common connection point connected to a second input terminal 108 of the half-bridge rectifier. Further, according to the fourth embodiment of the present invention one switching element 110 is connected in parallel to the first rectifying element 98.

According to the fourth embodiment, operatively the mobile side control circuit 40 is adapted to close the switching element 110 connected in parallel to the first rectifying element 98 to change the second operative mode to the DC mode without polarity reversal of the voltage across the energy storage circuit 34.

As shown in FIG. 19, assuming that the first rectifying element 98 of the half-bridge rectifier is bypassed upon occurrence of a failure state in the mobile side circuit 32 then during a positive half-cycle of the input current to the mobile side rectifier 32 the current flows as shown in the middle illustration of FIG. 19, while during a negative half-cycle of the input current to the mobile side rectifier 32 flows as shown in the right illustration of FIG. 19. I.e., in both case the current will flow across the switching element 110 and the energy storage circuit 34, however, along different directions.

The invention claimed is:

1. Mobile side circuit of a wireless power transmission system, comprising:
    a mobile side resonant circuit inductively coupled to a stationary side resonant circuit of the wireless power transmission system;
    a mobile side rectifier adapted to operate in a first operative mode being a half-bridge rectification mode or a full bridge rectification mode during failure free operation of the mobile side circuit;
    an energy storage circuit connected in parallel to the output terminals of the mobile side rectifier and adapted to smooth the output of the mobile side rectifier;
    characterized by
    a mobile side control circuit adapted to control at least one switching element connected in parallel to at least one rectifying element of the mobile side rectifier to change the first operative mode of the mobile side rectifier to a second operative mode upon occurrence of a failure state in the mobile side circuit; wherein
    the second operative mode is different from the first operative mode and is selected from a group comprising a half-bridge mode, a full-bridge mode, a DC mode where the voltage across the energy storage circuit is switched through to the input of mobile side rectifier with or without polarity reversion, and an antiphase mode where the input voltage and the input current of the mobile side rectifier are phase-shifted with respect to each other according to a predetermined range of phase-shift.

2. The mobile side circuit according to claim 1, the mobile side rectifier is a full-bridge rectifier comprising four rectifying elements and comprises one switching element connected to one of the rectifying elements wherein the mobile side control circuit is adapted to close or open the one switching element upon occurrence of a failure state in the mobile side circuit to change the second operative mode to the half-bridge mode or the full-bridge mode.

3. The mobile side circuit according to claim 2, wherein the mobile side rectifier is a full-bridge rectifier having
    a first rectifying element and a second rectifying element connected in series between a first output terminal and a second output terminal of the full-bridge rectifier and having a common connection terminal connected to a first input terminal of the full-bridge rectifier;
    a third rectifying element and a fourth rectifying element connected in series between the first output terminal and the second output terminal of the full-bridge rectifier and having a common connection terminal connected to a second input terminal of the full-bridge rectifier; and
    one switching element connected in parallel to the first rectifying element, to the second rectifying element, to the third rectifying element, or to the fourth rectifying element.

4. The mobile side circuit according to claim 1, wherein the mobile side rectifier is a full-bridge rectifier having
    a first rectifying element and a second rectifying element connected in series between a first output terminal and a second output terminal of the full-bridge rectifier and having a common connection terminal connected to a first input terminal of the full-bridge rectifier;
    a third rectifying element and a fourth rectifying element connected in series between the first output terminal and the second output terminal of the full-bridge rectifier and having a common connection terminal connected to a second input terminal of the full-bridge rectifier;
    one switching element connected in parallel to the first rectifying element; and
    one switching element is connected in parallel to the fourth rectifying element; wherein
    the mobile side control circuit is adapted to close or open simultaneously the switching element connected in parallel to the first rectifying element and the switching element connected in parallel to the fourth rectifying element upon occurrence of a failure state in the mobile side circuit to change the second operative mode to the DC-mode without polarity reversal of the voltage across the energy storage circuit or to the full-bridge mode.

5. The mobile side circuit according to claim 1, wherein the mobile side rectifier is a full-bridge rectifier having
    a first rectifying element and a second rectifying element connected in series between a first output terminal and a second output terminal of the full-bridge rectifier and having a common connection terminal connected to a first input terminal of the full-bridge rectifier;
    a third rectifying element and a fourth rectifying element connected in series between the first output terminal and the second output terminal of the full-bridge rectifier and having a common connection terminal connected to a second input terminal of the full-bridge rectifier;
    one switching element connected in parallel to the second rectifying element; and
    one switching element connected in parallel to the third rectifying element; wherein
    the mobile side control circuit is adapted to close or open simultaneously the switching element connected in parallel to the second rectifying element and the switching element connected in parallel to the third rectifying element upon occurrence of a failure state in the mobile side circuit to change the second operative mode to the DC-mode with polarity reversal of the voltage across the energy storage circuit or to the full bridge mode.

6. The mobile side circuit according to claim 1, wherein the mobile side rectifier is a full-bridge rectifier having
    a first rectifying element and a second rectifying element connected in series between a first output terminal and a second output terminal of the full-bridge rectifier and having a common connection terminal connected to a first input terminal of the full-bridge rectifier;
    a third rectifying element and a fourth rectifying element connected in series between the first output terminal and the second output terminal of the full-bridge rectifier and having a common connection terminal connected to a second input terminal of the full-bridge rectifier;

one switching element connected in parallel to the first rectifying element;

one switching element connected in parallel to the second rectifying element;

one switching element is connected in parallel to the third rectifying element; and one switching element connected in parallel to the fourth rectifying element; wherein the mobile side control circuit is adapted to change the second operative mode to the antiphase mode by simultaneously closing the switching element connected in parallel to the first rectifying element and the switching element connected in parallel to the fourth rectifying element and opening the switching element connected in parallel to the second rectifying element and the switching element connected in parallel the third rectifying element during a negative cycle of the current from the mobile side resonant circuit; and by simultaneously closing the switching element connected in parallel to the second rectifying element and the switching element connected in parallel to the third rectifying element and opening the switching element connected in parallel to the first rectifying element and the switching element connected in parallel to the fourth rectifying element during a positive cycle of the current from the mobile side resonant circuit.

7. The mobile side circuit according to claim 1, wherein the mobile side rectifier is a full-bridge rectifier having
a first rectifying element and a second rectifying element connected in series between a first output terminal and a second output terminal of the full-bridge rectifier and having a common connection terminal connected to a first input terminal of the full-bridge rectifier;

a third rectifying element and a fourth rectifying element connected in series between the first output terminal and the second output terminal of the full-bridge rectifier and having a common connection terminal connected to a second input terminal of the full-bridge rectifier;

one switching element connected in parallel to the first rectifying element;

one switching element connected in parallel to the second rectifying element;

one switching element connected in parallel to the third rectifying element; and one switching element connected in parallel to the fourth rectifying element; wherein the mobile side control circuit is adapted to change the second operative mode to the antiphase mode such that an input voltage to the mobile side rectifier has a phase shift in the range of 180°±30° or 90°±30° with respect to the input current to the mobile side rectifier for back transfer of power from the mobile side circuit to the stationary side circuit of the wireless power transmission system.

8. The mobile side circuit according to claim 1, wherein the mobile side rectifier is a half-bridge rectifier having
a first rectifying element and a second rectifying element connected in series between a first output terminal and a second output terminal of the half-bridge rectifier and having a common connection terminal connected to a first input terminal of the half-bridge rectifier and having the connection terminal of the second rectifying element different from the common connection point connected to a second input terminal of the half-bridge rectifier; and one switching element connected in parallel to the first rectifying element; wherein the mobile side control circuit is adapted to close the switching element connected in parallel to the first rectifying element to change the second operative mode to the DC mode without polarity reversal of the voltage across the energy storage circuit.

9. The mobile side circuit according to claim 1, comprising a mobile side detector adapted to detect the occurrence of a failure state in the mobile side circuit, wherein the mobile side controller is adapted to open a switch connecting the energy storage circuit to a mobile side load when the mobile side detector detects the occurrence of a failure state in the mobile side circuit.

10. The mobile side circuit according to claim 1, comprising a mobile side communication interface adapted to indicate the occurrence of a failure state at the mobile side circuit to the stationary side control circuit of the wireless power transmission system.

11. Wireless power transmission system, characterized by comprising:
at least one mobile side circuit according to claim 1;
a stationary side excitation unit adapted to excite a stationary side resonant circuit for wireless power transmission to the at least one mobile side circuit;
a stationary side controller adapted to
control operation of the stationary side excitation unit,
monitor power transfer to the at least one mobile side circuit, and to
interrupt wireless power transmission when a change in an amount of power transmitted to the at least one mobile side circuit exceeds a predetermined threshold.

12. Wireless power transmission system according to claim 11, where the stationary side control circuit is adapted to interrupt wireless power transmission to the at least one mobile side circuit when the amount of power transmitted to the mobile side circuit changes 5% or more.

13. Wireless power transmissions system according to claim 11, comprising a stationary side communication interface adapted to receive notification of occurrence of a failure at the at least one mobile side circuit, wherein the stationary side control circuit is adapted to interrupt wireless power transmission upon receipt of the notification of occurrence of a failure at the at least one mobile side circuit.

14. Method of operating a mobile side circuit of a wireless power transmission system according to claim 1, the method comprising:
a step of operating the mobile side rectifier in a first operative mode being a half-bridge rectification mode or a full bridge rectification mode during failure free operation of the mobile side circuit;
a step of controlling at least one switching element connected in parallel to at least one rectifying element of the mobile side rectifier to change the first operative mode of the mobile side rectifier to a second operative mode upon occurrence of a failure state in the mobile side circuit; wherein
the second operative mode is different from the first operative mode and is selected from a group comprising a half-bridge mode, a full-bridge mode, a DC mode where the voltage across the energy storage circuit is switched through to the input of mobile side rectifier with or without polarity reversal, and an antiphase mode where the input voltage and the input current of the mobile side rectifier are shifted with respect to each other according to a predetermined range.

15. Method of operating a wireless power transmission system according to claim 11 comprising:
- a step of monitoring power transfer to the mobile side circuit; and
- a step of interrupting wireless power transmission when a change in an amount of power transmitted to the mobile side circuit exceeds a predetermined threshold.

* * * * *